United States Patent [19]

Provino et al.

[11] Patent Number: 5,778,384

[45] Date of Patent: Jul. 7, 1998

US005778384A

[54] SYSTEM AND METHOD FOR AUTOMOUNTING AND ACCESSING REMOTE FILE SYSTEMS IN MICROSOFT WINDOWS IN A NETWORKING ENVIRONMENT

[75] Inventors: Joseph E. Provino, Cambridge; Philip M. Rosenzweig, Acton, both of Mass.

[73] Assignee: Sun Microsystems, Inc., Palo Alto, Calif.

[21] Appl. No.: 577,822

[22] Filed: Dec. 22, 1995

[51] Int. Cl.$^6$ .................................................. G06F 17/30
[52] U.S. Cl. ................................................ 707/200; 395/500
[58] Field of Search .................................. 395/616, 500; 707/200

[56] References Cited

U.S. PATENT DOCUMENTS

| | | | |
|---|---|---|---|
| 5,247,638 | 9/1993 | O'Brien et al. | 395/888 |
| 5,537,585 | 7/1996 | Blickenstaff et al. | 707/205 |
| 5,581,724 | 12/1996 | Belsan et al. | 711/114 |
| 5,627,996 | 5/1997 | Bauer | 395/500 |
| 5,689,701 | 11/1997 | Ault et al. | 395/500 |

OTHER PUBLICATIONS

B. Welch, "A Comparison Of Three Distributed File System Architectures: Vnode, Sprite and Plan 9," Computing Systems, vol. 7, No. 2, 1 Jan. 1994, pp. 175–199.

A. D. Marshall, et al., "On The Feasibility of ISO FTAM–Based File Servers To Implement A Heterogeneous File System," Computer Standards And Interfaces, vol. 14, No. 3, 1 Jan. 1992, pp. 191–208.

H. C. Rao, et al., "Accessing files in an Internet: the Jade file system," IEEE Transactions on Software Engineering, Jun. 1993, vol. 19, No. 6, pp. 613–624.

Anonymous, "OS/2 Logical File System," IBM Technical Disclosure Bulletin, vol. 34, No. 12, May 1992, pp. 370–371.

Primary Examiner—Wayne Amsbury
Attorney, Agent, or Firm—Richard Jordan

[57] ABSTRACT

A virtual file system accessing subsystem is disclosed for use in connection with a computer system connected in a computer network. The computer system runs a selected operating system, such as Microsoft's MS-DOS and Windows operating systems. The virtual file system accessing subsystem facilitates the accessing of a virtual logical storage device that is identified by a virtual logical storage device identifier and that has a virtual logical storage device file system that includes at least a portion of a remote file system maintained by another device connected in the computer network. The virtual file system accessing subsystem comprises an operating system request redirector for enabling the operating system to direct access requests from an application program which identify the virtual logical storage device to a remote access element for processing. The remote access element initiates access operations in connection with the portion of the remote file system which is included in the virtual logical storage device file system in response to an access request that is generated by an application program which identifies the virtual logical storage device identifier, which access request has been transferred thereto said remote access element by the operating system. If the portion of the remote file system being accessed has not previously been mounted, the remote access element enables an automounting element to initiate a mounting operation in connection with the remote file system to mount the portion, after which the remote access element can perform the access operation.

111 Claims, 10 Drawing Sheets

SYSTEM AND METHOD FOR AUTOMOUNTING AND ACCESSING REMOTE FILE SYSTEMS IN MICROSOFT WINDOWS IN A NETWORKING ENVIRONMENT

FIELD OF THE INVENTION

The invention relates generally to the field of digital computer systems and more specifically to a system and method for facilitating the automounting and accessing of remote mass storage subsystem storage devices for use in connection with the Microsoft Windows operating system in a networking environment.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations are used by individual users to perform processing in connection with data and programs that may be stored in the network mass storage subsystems. In such an arrangement, the personal computers/workstations, operating as clients, download the data and programs from the network mass storage subsystems for process. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations being interconnected by communication links such as electrical wires or optic fibers.

In performing processing operations, computer systems make use of applications programs to perform such operations as database management, word processing, accounting, process control and numerous other functions in an office or industrial environment. The applications programs generally make uses of an operating system both to provide an environment in which they can be conveniently executed, to provide system services such as low-level control of various hardware elements, and to provide access to files stored on storage devices of a number of mass storage subsystems which are accessible over the network. One popular operating system, namely, Microsoft Windows™ ("Windows") operates in conjunction with Microsoft's MS-DOS ("MS-DOS") operating system to provide an operating environment in which applications programs written for Windows can be executed. The Windows operating system provides, among other things, a graphical user interface ("GUI") as well as a multi-tasking operating environment in which a plurality of Windows programs can be executing contemporaneously.

With particular reference to accessing of files on mass storage subsystems, typically files are accessible through a "file system." File systems used with modern operating systems are typically organized into a number of directories, with each file that is accessible through the file system being associated with a directory. The directories themselves are generally organized in a tree structure. The directory tree structure for a file system normally includes an upper level "root" directory, which has one or more child directories. Each of the root directories' child directories may also have one or more child directories, and so on down the tree. Each directory is essentially a file (a "directory file") that contains information including the location(s) in the mass storage subsystem of files in the directory and pointers to directory files for its child directories and also a pointer to the directory file for its parent directory, that is, the directory of which it is a child. To access a file in a directory, the directory files along the path from the root directory to the directory containing the file are searched to locate the successive directory files along the path, until the directory file is located for the directory containing the file to be accessed. When the directory file is located for the directory containing the file to be accessed, the location information in the directory file is used to find the location of the file to be accessed.

Before a file system, or a portion of a file system, can be accessed (that is, before a file in the file system or portion thereof can be accessed) it must be "mounted." Mounting among other things conditions the pointers in the directory files so that the path through the file system's directory structure can be traversed. Some operating systems, such as Unix, provide a uniform file system to each particular computer user, without respect to the particular mass storage subsystems or devices on which the files are stored; that is, the file system that is available to a user may extend across a number of devices. When a storage device is added to the network, directories and files on the storage device may be added to the file system by "mounting" the storage device, which makes its directory on the storage device available to the users in a seamless manner. Similarly, when a storage device is removed from the network, the directories and files on the storage device will be deleted from the file system (although they may still reside on the storage device being removed), in which case they will not be available to the users.

The MS-DOS and Windows operating systems also allow for a file system having a tree-structured directory structure. However, unlike Unix, in MS-DOS and Windows the file systems are intimately related to a "device," which may be, for example, a particular physical storage device or a logical device which may be a subset of the physical device. In MS-DOS and Windows, access to a file requires identifying a particular device, thus each device essentially defines at least one file system, and to access a file on a device's file system a file specifier requires specification of a particular device as well as the path along the directory structure on the device to the particular file to be accessed. (Both MS-DOS and Windows allow for a designation of a current or default device, which will be used if no device specifier is explicitly provided.) While requiring a device specifier is generally not a problem with a stand-alone personal computer or workstation, which generally will have only a few devices, problems may arise when a personal computer or workstation is connected in a network, since the network may include a large number of devices whose file systems a user may wish to access.

SUMMARY OF THE INVENTION

The invention provides a new and improved system and method for facilitating the automounting and accessing of remote file systems in a networking environment for use in connection with the Microsoft MS-DOS and Windows operating systems in a networking environment.

In brief summary, in one aspect the invention provides a virtual file system accessing subsystem for use in connection with a computer system connected in a computer network. The computer system runs a selected operating system, such as Microsoft's MS-DOS and Windows operating systems. The virtual file system accessing subsystem facilitates the accessing of a virtual logical storage device that is identified by a virtual logical storage device identifier and that has a virtual logical storage device file system that includes at least a portion of a remote file system maintained by another device connected in the computer network. The virtual file system accessing subsystem comprises an operating system request redirector for enabling the operating system to direct access requests from an application program which identify the virtual logical storage device to a remote access element for processing. The remote access element initiates access operations in connection with the portion of the remote file system which is included in the virtual logical storage device file system in response to an access request that is generated by an application program which identifies the virtual logical storage device identifier, which access request has been transferred thereto by the operating system. If the portion of the remote file system being accessed has not previously been mounted, the remote access element enables an automounting element to initiate a mounting operation in connection with the remote file system to mount the portion, after which the remote access element can perform the access operation. The virtual logical storage device, identified by a single identifier, can be used to identify portions of a number of remote file systems, so that an application program can access a number of remote file systems using a single device identifier.

In another aspect, the invention provides a virtual file system accessing subsystem for use in connection with a computer system connected in a computer network. The computer system runs selected operating system, such as Microsoft's MS-DOS and Windows operating systems. The virtual file system accessing subsystem facilitates accessing of a plurality of virtual logical storage devices, each identified by a virtual logical storage device identifier. Each virtual logical storage device has a virtual logical storage device file system that includes at least a portion of a remote file system maintained by another device connected in the computer network, at least some virtual logical storage device file systems including a hierarchical directory system defining a plurality of possible paths each having a path identifier. At least one of the virtual logical storage device file systems that include hierarchical directory systems has an associated default path comprising one of the possible paths. The virtual file system accessing subsystem includes an operating system request redirector for enabling the operating system to direct access requests received from an application program which identify a the virtual logical storage device to the remote access element. The operating system receiving access requests from a the application program and provides, to a remote access element, those access requests which include the virtual logical storage device identifier. Along with the access requests, the operating system provides to the remote access element, for the access requests received from the application program which do not include a path identifier, a path identifier for the default path for the virtual logical storage device identified by the virtual logical storage device. A remote access element initiates an access operation in connection with the virtual logical storage device file system maintained by the virtual logical storage device in response to access requests received from the operating system which include the virtual logical storage device identifier and a the path identifier. During the access operation, the remote access element accesses the portion of the remote file system that is included in the virtual logical storage device file system along the path identified by the path identifier.

In yet another aspect, the invention provides a virtual file system accessing subsystem for use in connection with a computer system connected in a computer network. The computer system runs a selected operating system, such as Microsoft's MS-DOS and Windows operating systems. The virtual file system accessing subsystem facilitates accessing of a virtual logical storage device that is identified by a virtual logical storage device identifier and that has a virtual logical storage device file system that includes an identifier identifying at least a portion of a remote file system maintained by another device connected in the computer network. The virtual file system accessing subsystem comprises an operating system request redirector for enabling the operating system to direct access requests which identify the virtual logical storage device to a remote access element. The remote access element initiates an access operation in connection with the virtual logical storage device file system maintained by the virtual logical storage device in response to an access request that the remote access element receives from the operating system which includes the virtual logical storage device identifier. During the access operation, the remote access element accesses the portion of the remote file system identified by the remote file system portion identifier.

BRIEF DESCRIPTION OF THE DRAWINGS

This invention is pointed out with particularity in the appended claims. The above and further advantages of this invention may be better understood by referring to the following description taken in conjunction with the accompanying drawings. in which:

DETAILED DESCRIPTION OF AN ILLUSTRATIVE EMBODIMENT

Figure 1:
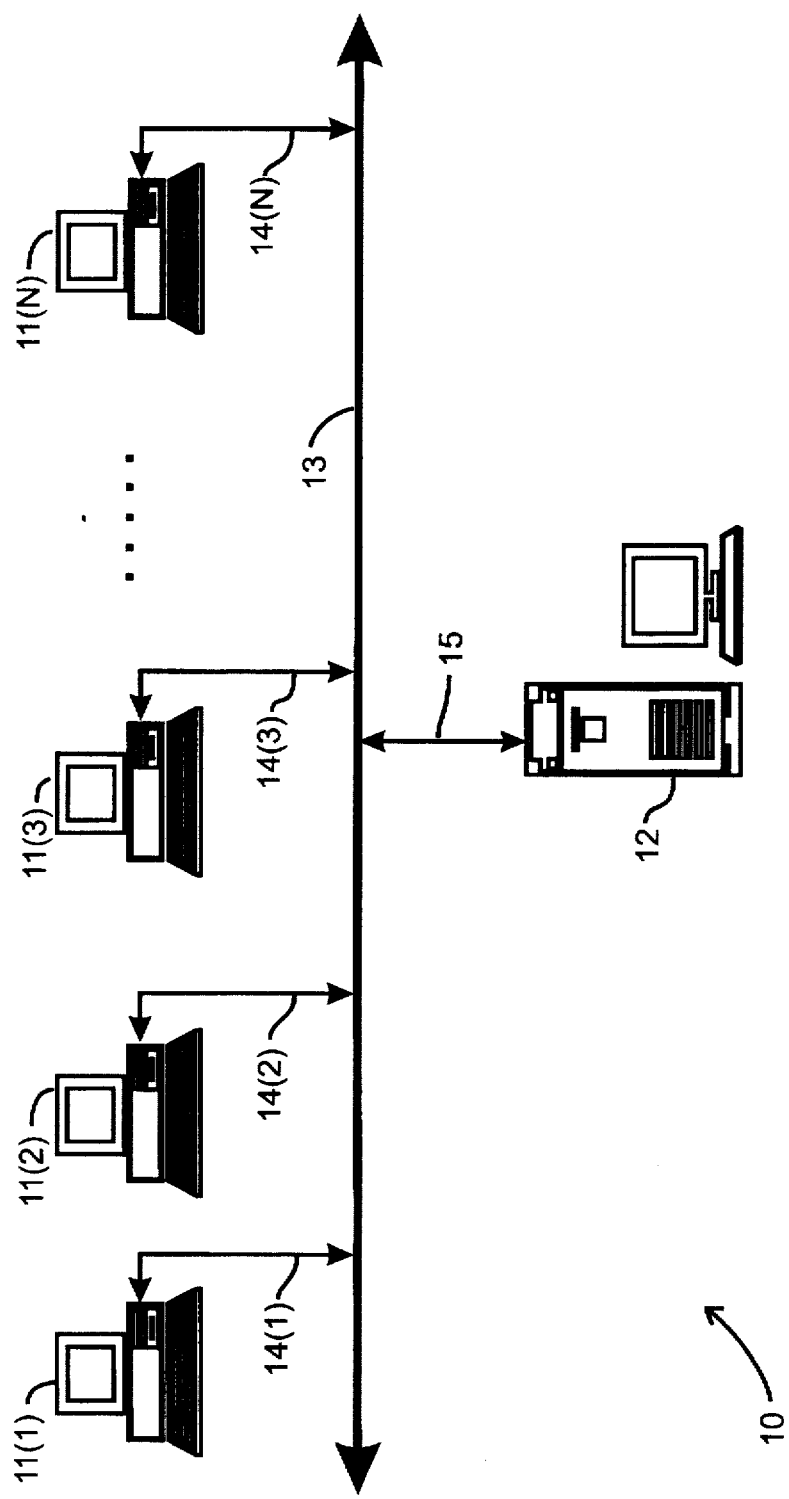
FIG. 1 is a schematic diagram of a computer network including a system for automounting mass storage subsystem storage devices in Microsoft windows, constructed in accordance with the invention.

FIG. 1 is a schematic diagram of a computer network including a system for automounting mass storage subsystem storage devices in Microsoft windows, constructed in accordance with the invention. With reference to FIG. 1, computer network 10 includes a plurality of computers 11(1) through 11(N) (generally identified by reference numeral 11(n)) and 12 which are interconnected by a communication link 13. As is conventional, at least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. The computers 11(n) and 12 are of the conventional stored-program computer architecture, a system unit generally includes processing, memory, mass storage devices such as disk and/or tape storage elements and other elements (not separately shown), including network interface devices 14(n), 15 for interfacing the respective computer to the communication link 13. A video display unit permits the computer to display processed data and processing status to the user, and an operator input device enable the user to input data and control processing by the computer. The computers 11(n) and 12 transfer information, in the form of messages, through their respective network interface devices 14(n), 15 among each other over the communication link 13.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The communication link 13 interconnecting the client computers 11(n) and server computer 12 in the network 10 may, as is conventional, comprise wires, optical fibers or other media for carrying signals representing information among the computers 11 (n) and 12. As noted above, each of the computers 11(n) typically includes a network interface device (represented by respective arrows 14(n) and 15), which connects the respective computer to the communications link 13.

In one particular embodiment, the computers 11(n) use the Microsoft Windows™ operating system program ("Windows"), and the server computer 12 uses the Microsoft Windows-NT operating system program. Windows provides a number of conventional operating system services in connection with the computers 11(n), including initializing the computers when they are powered-up or reinitialized. In addition, Windows provides a number of conventional operating system services to applications programs that are processed by the computers, including providing a graphical user interface ("GUI").

MS-DOS and Windows also facilitate accessing files (that is, reading of data from and storage of data in the files) in file systems maintained in the system 10. Most particularly, MS-DOS and Windows enable a computer 11(n) to access local file systems provided by the computer system's local mass storage subsystem(s), and also to access remote file systems which are maintained by other computer systems 11(n') (n'≠n) and the server computer 12. In particular, the invention provides a system and method for use with, for example, the Microsoft MS-DOS and Microsoft Windows™ operating systems, to provide for automounting of virtual logical storage devices to facilitate ready access by a computer 11(n). A virtual logical storage device may comprise one or more directories or directory sub-trees that are associated with a single device specifier. As will be clear from the following description, a virtual logical device may be formed from directories that are located on a single mass storage subsystem or on a number of mass storage subsystems, with all of the directories forming the virtual logical device being aggregated for reference by a single device identifier. One or more of the directories may be located on a local mass storage subsystem, that is, a mass storage subsystem located on the computer system 11(n). Other directories on the virtual logical storage device may be located on a mass storage subsystem maintained by another computer system, including any of the computer systems 11(n') (n'≠n) connected in the network, and still other directories may be located on mass storage subsystems maintained by the server computer 12. In such an arrangement, for directories that are located on a local mass storage subsystem, MS-DOS and Windows can access files that are in the directories in the same manner that they access files in file systems that are on a device that is specified by a device identifier that identifies a real storage device in the mass storage subsystem maintained for the computer system 11(n).

On the other hand, for directories that are physically located in a remote mass storage subsystem, that is, a mass storage subsystem maintained by another computer system 11(n') (n'≠n) or by the server computer 12, MS-DOS and Windows access the files in those directories by performing a remote access operation. In such an operation, by transferring messages over the communication link 14 in a conventional manner. However, allowing the operator or application programs to access file systems on a number of physical devices by use of a virtual logical storage device identifier, without needing to know the actual physical locations of the physical devices or network protocols required to access the file systems, simplifies file access by the operator or application programs.

Figure 2:
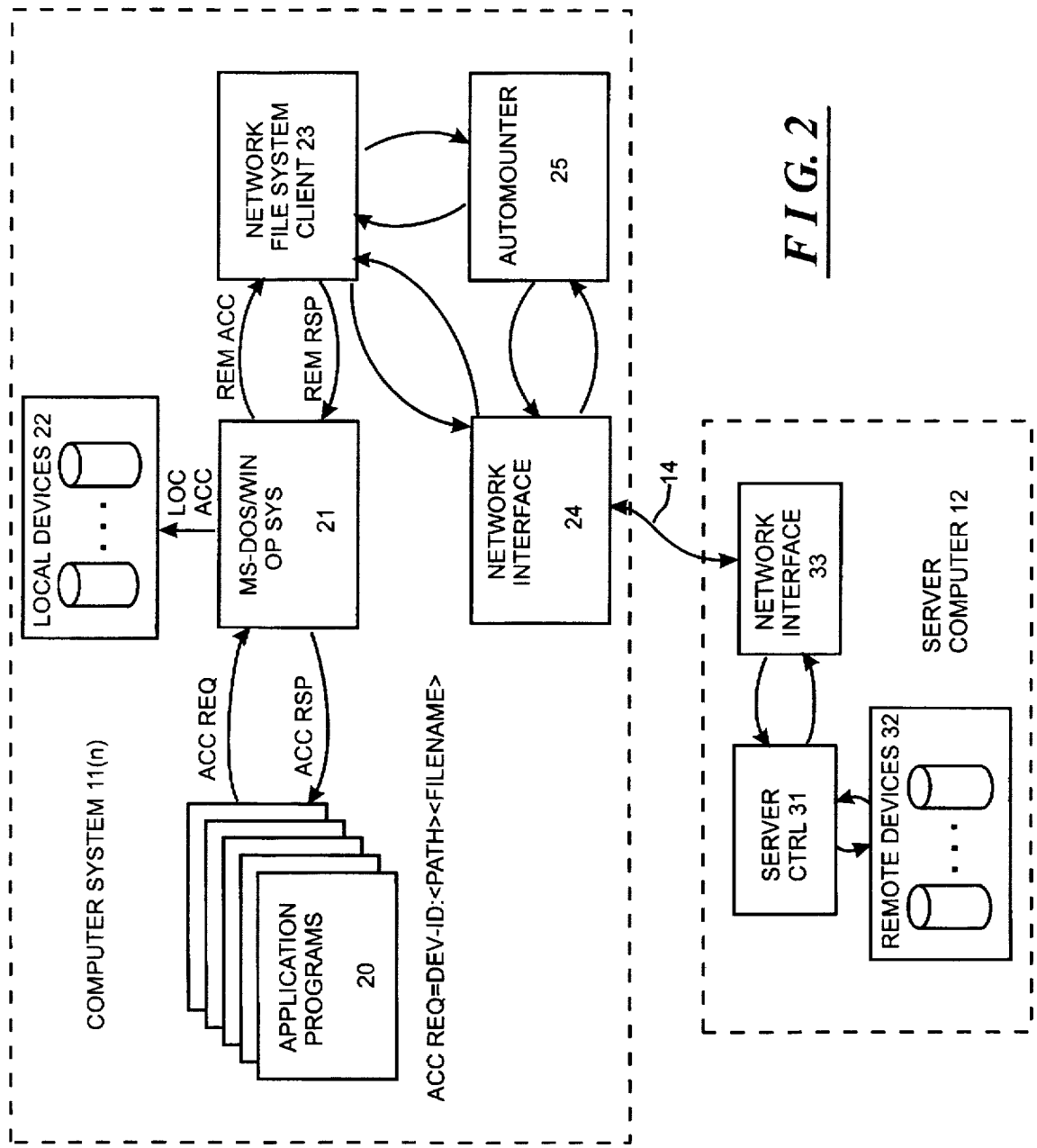
FIG. 2 is a functional block diagram of a computer system including a network file system client module and an automounter module in accordance with the invention.

FIG. 2 depicts a detailed functional diagram of computer system 11(n) for use in connection with the invention. As shown in FIG. 2, the computer system 11(n) processes application programs generally identified by reference numeral 20, in connection with the MS-DOS and Windows operating systems generally identified by reference numeral 21. With particular reference to accessing of a file in a file system that is maintained by either one of the computer system's local storage device 22 or virtual logical storage devices, the application programs will issue access requests "ACC REQ," to the MS-DOS/Windows operating systems 21. The access request will generally be of the form DEV-ID:<PATH×FILENAME>, where DEV-ID identifies a particular storage device (which may be either a local device 22 or a virtual logical storage device), <PATH> identifies a path through the device's directory structure, and <FILENAME> is a filename identifying a file in the directory identified by the path identifier <PATH>. If the storage device is a currently-selected default device, the access request need not include the device identifier DEV-ID. Similarly, if the storage device and path are a currently-selected default device and path, the access request need not explicitly include the device identifier DEV-ID and path identifier <PATH>.

When the MS-DOS/Windows operating system 21 receives the access request ACC REQ from the application program 20, it initially determines whether the device to be accessed is a local device 22 or a virtual logical storage device. If the MS-DOS/Windows operating system 21 determines that the access request ACC REQ is for a local device 22, it initiates a local access operation LOC ACC in connection with the local device 22. It will be appreciated that the particular operation to be performed will depend on the type of operation specified in the ACC REQ, including, for example, opening and closing of the particular file <FILENAME>, storing data in the file or retrieving data therefrom, or the like.

On the other hand, if the MS-DOS/Windows operating system 21 determines that the access request ACC REQ is for a virtual logical storage device, it issues a remote access REM ACC to a network file system client module 23. The network file system client module 23 handles certain message transfers over the network communication link 14, with specific reference to the invention initiating the access operation in connection with the actual physical device which contains the portion of virtual logical storage device's file system which contains the path <PATH> and file <FILENAME> identified in the access request ACC REQ.

Prior to initiating the access operation, the network file system client module 23 will determine whether the portion of the virtual logical storage's device file system containing the file <FILENAME> to be accessed has been mounted. If the network file system client module 23 determines that the portion of the virtual logical storage device containing the file <FILENAME> to be accessed has been mounted, it can initiate the access operation through a network interface 24. In that operation, the network file system client module 23 and, for example, the server control module 31 of the server computer 12 which maintains the physical storage device 32 whose file system contains the portion of the virtual logical storage device's file system as defined by the access request ACC REQ, will exchange messages through their respective network interfaces 24 and 33 to enable the server control module 31 to perform the access operation.

On the other hand, if the network file system client module 23 determines that the portion of the virtual logical storage device containing the file <FILENAME> to be accessed has not been mounted, it (the network file system client module 23) provides an automount request AUTOMNT REQ to an automounter module 25. In response to the automount request AUTOMNT REQ, the automounter module 25 will initiate a mounting operation in connection with (continuing with the previous example) the server control module 31 of the server computer 12 which maintains the physical storage device 32 whose file system contains the portion of the virtual logical storage device's file system as defined by the access request ACC REQ. In the mounting operation, the automounter module 25 and server control module 31 will exchange messages through their respective network interfaces 24 and 33 over the network 14. During the mounting operation, the automounter module 25 updates various data structures, will be described below. The data structures contain information for each file system which has been mounted by the automounter module 25, which is used by the network file system client module 23 in processing an access request for an access operation for the respective file system. After receiving the updated data structures, the network file system client module 23 can use the new information to process the access request as described above. Thus, the automounter 25 will automatically mount remote file systems or portions thereof as they are needed by access requests ACC REQ from the application programs 20 to the virtual logical storage device(s) maintained by the computer system 11(n).

In addition to processing access requests for remote file systems and initiating mounting of remote file systems by the automounter 25, the network file system client 23 can also keep track of the access requests for the various mounted remote file systems, and for those remote file systems which have not been accessed within a predetermined amount of time, initiate unmounting. If the network file system client module 23 has unmounted a remote file system, it may be later remounted by the automounter 25 in the same manner as described above.

Figure 3:
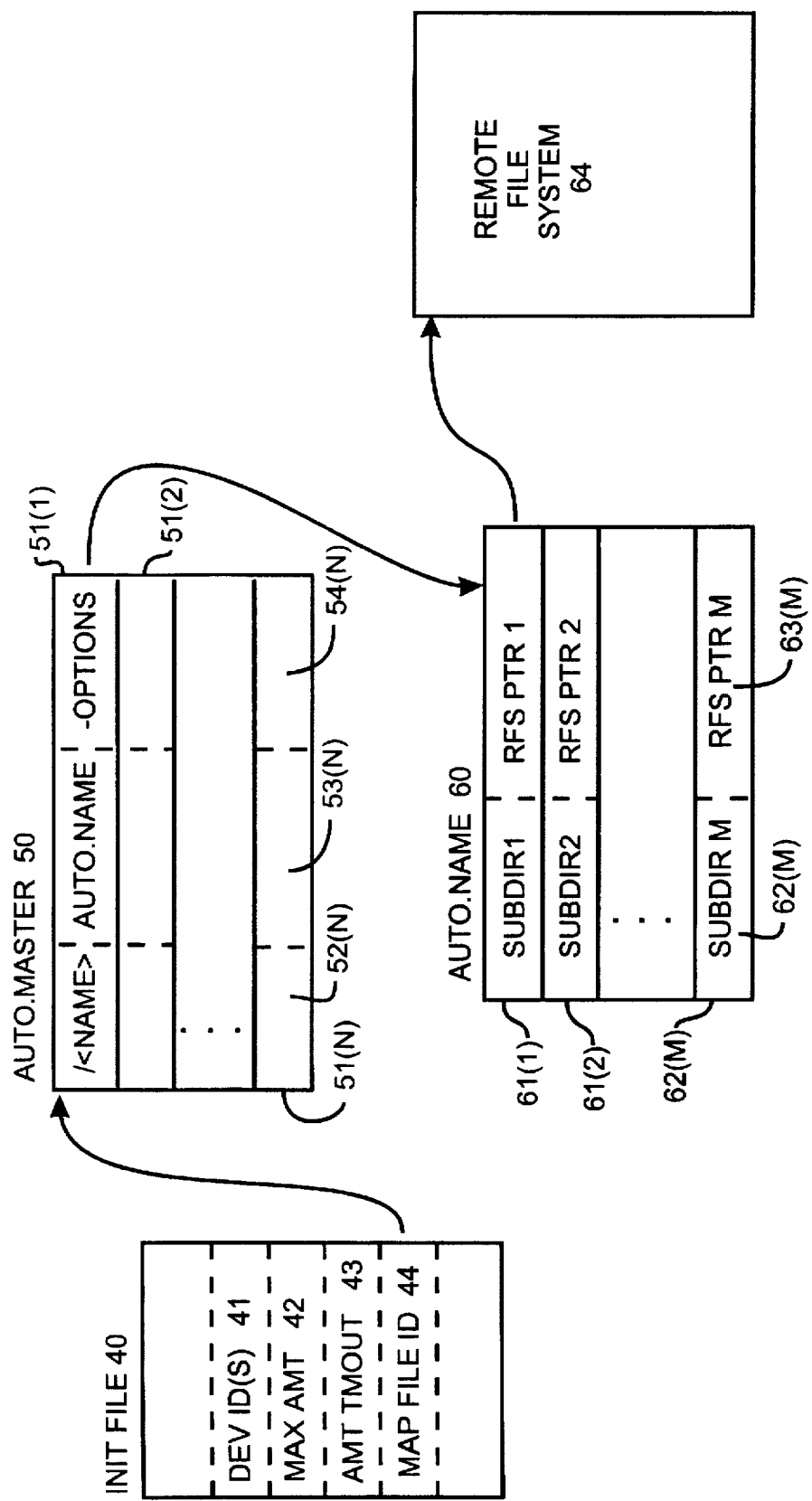
FIG. 3 is a diagram depicting various data structures which are used by the network file system client module and automounter module depicted in FIG. 2 FIGS. 4 through 6 depict flow charts which are useful in understanding the operation of the network file system client module and automounter module depicted in FIG. 2.

The network file system client module 23 and automounter 25 make use of several items of information in identifying virtual logical storage device(s) and the remote file systems which form the file system(s) of the respective virtual logical storage device(s), which will be described in connection with FIG. 3. With reference to FIG. 3, the computer system's initialization file 40 includes a number of fields containing automount information used by the network file system client module 23 and automounter 25, including a virtual device identifier field 41, a maximum automounts field 42, an automount timeout field 43 and a map file identifier field 44. The initialization file 40 is used by the MS-DOS/Windows operating system module 21 to initialize the computer system 11(n), and may comprise, for example, an ".INI" initialization file which contains initialization and environment information used to define the processing environment under Windows. (As is conventional, a Windows file with the complete file name of the form "XXX.INI" file has "XXX" as a file name, and "INI" as the file extension. The ".INI" file extension identifies the file as an initialization file.)

The virtual device identifier field 41 of initialization file 40 contains information to identify virtual logical storage device(s), in particular providing the specific device identifier(s) DEV-ID for the virtual logical storage device(s). If the virtual device identifier field 41 is empty, a selected device identifier is used as a default virtual device identifier, in particular a device identifier that is selected as a "last device" identifier for the computer system 11(n). For the MS-DOS/Windows operating system 21, a "last device" identifier may be specified in, for example a system configuration file identified by filename "CONFIG.SYS." It will be appreciated that the virtual device identifier field 41 may contain a single device identifier or a number of device identifiers; if the virtual device identifier field 41 contains a number of device identifiers, each different device identifier may individually identify a virtual logical storage device.

Continuing with the automount information fields in the initialization file 40, the maximum automounts field 42 contains a value which identifies the maximum number of remote file systems which can be mounted. The automount timeout field 43 contains a timeout value which identifies the maximum time, following issuance by the automounter module 25 of an automount request AUTOMNT REQ, that the automounter module 25 will wait for an acknowledgment that the requested remote file system has been mounted.

The map file identifier field 44 contains a pointer to a file containing an automount master map, which is identified in FIG. 3 by reference numeral 50. The automount master map contains information which identifies the various file systems that are to be automounted and accessed using the virtual logical storage device identifiers in the device identifier field 41. In one embodiment, the same automount master map 50 is used for all device identifiers if the device identifier field 41 contains multiple device identifiers, although it will be appreciated that a separate automount master map 50 may be provided for each device identifier. As shown in FIG. 3, the automount master map 50 includes one or more entries 51(1) through 51(N) (generally identified by reference numeral 51(n)), each of which is associated with a high-level directory in the file system associated with the virtual logical storage device(s). Each entry 51(n) includes a number of fields, including a directory name field 52(n), an automount subdirectory name field 53(n), and an options field 54(n). Each of the directory name fields 52(n) contains a directory name, which will be used as the name of the topmost directory in a directory tree. Subdirectories under the top level directory, along with pointers to remote file systems, or portions thereof, forming the respective sub-directories, are identified in an automount subdirectory map file identified by reference numeral 60, which will be described below. The automount subdirectory name field 53(n) identifies the automount subdirectory map file 60 that is to be associated with the directory identified in field. The options field 54(n) contains values for a number of optional parameters which may control mounting of the remote file system and accessing of files, including whether the file system can be read, written or both, whether files can be locked, a mount timeout value and a mount attempt retry value, and the like.

As noted above, the automount subdirectory map file 60 identifies the components of the file system under the top level directory. In accordance with one aspect of the invention, an automount subdirectory map file 60 may contain subdirectory identifiers, or alternatively it may contain explicit identifiers for a remote computer system 11(n') (n'≠n) or the server computer 12 and path thereon. If an automount subdirectory map file 60 contains an explicit identifier for a remote computer system 11(n') (n'≠n) or the server computer 12 and path thereon, that may be indicated by an appropriate indication in the options field 54(n) of the entry 51(n) of the automount master map 50 which points thereto; in one particular embodiment, an option "HOST" is used to identify such a map 60. For those automount subdirectory map files 60 which contain subdirectory names, for each subdirectory, a pointer to a remote file system or portion thereof is provided which forms the respective subdirectory.

The automount subdirectory map file 60 includes a number of entries 61(1) through 61(M) (generally identified by reference numeral 61(m)) each of which is associated with a subdirectory under the top level directory whose automount subdirectory name field 53(n) points to the automount subdirectory map file 60. Each entry 61(m) includes two fields, namely, a subdirectory name field 62(m) and a remote file system pointer field 63(m). The subdirectory name field 62(m) contains a subdirectory name which identifies the subdirectory under the top level directory, or the explicit identifier of a remote computer system 11(n') (n'≠n) or the server computer 12 and path thereon. The remote file system pointer field 63(m), in turn, contains a pointer to the remote file system, or portion thereof, (identified by reference numeral 64) which is to be mounted for the subdirectory identified in subdirectory name field 62(m). Thus, the remote file system pointer field 63(m) contains, for example, the name of a remote computer system 11(n') (n'≠n) or server computer 12. The automount subdirectory map files 60 that are pointed to by the automounter master map file 50 effectively define the mount points for the virtual logical storage device(s); that is, they define the various subdirectories under the respective directories identified in the automount master map file 50, and in addition identify the particular elements of the remote file systems which comprise the portions of the file system of computer system 11(n) mounted at those mount points.

In the embodiment described above in connection with FIG. 3, the computer system 11(n) is provided with a single automount master map 50, which is pointed to by the map file identifier field 44 in the initialization file 40. In that case, if the device identifiers field 41 contains identifiers for a number of virtual logical storage devices, all of the virtual logical storage devices will have the same top-level directory or directories, which are set forth in the map automount master map 50, and will also have the same subdirectories as identified in the automount subdirectory map file 60. It will be appreciated, however, that different computer system 11(n) may have different sets of virtual logical storage devices, since the map file identifier fields 44 in their respective initialization files 40 may differ.

Figure 4:
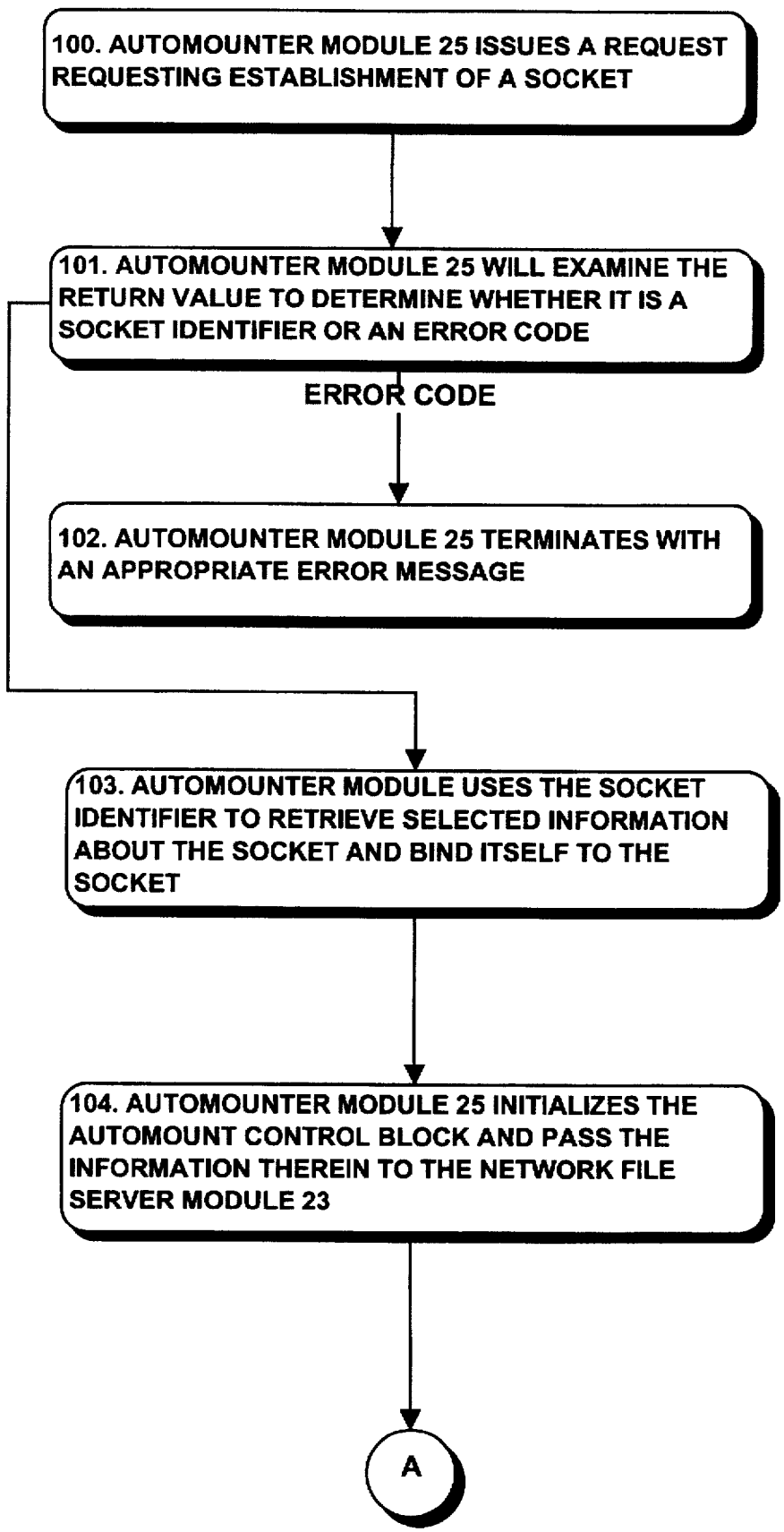
Figure 4A:
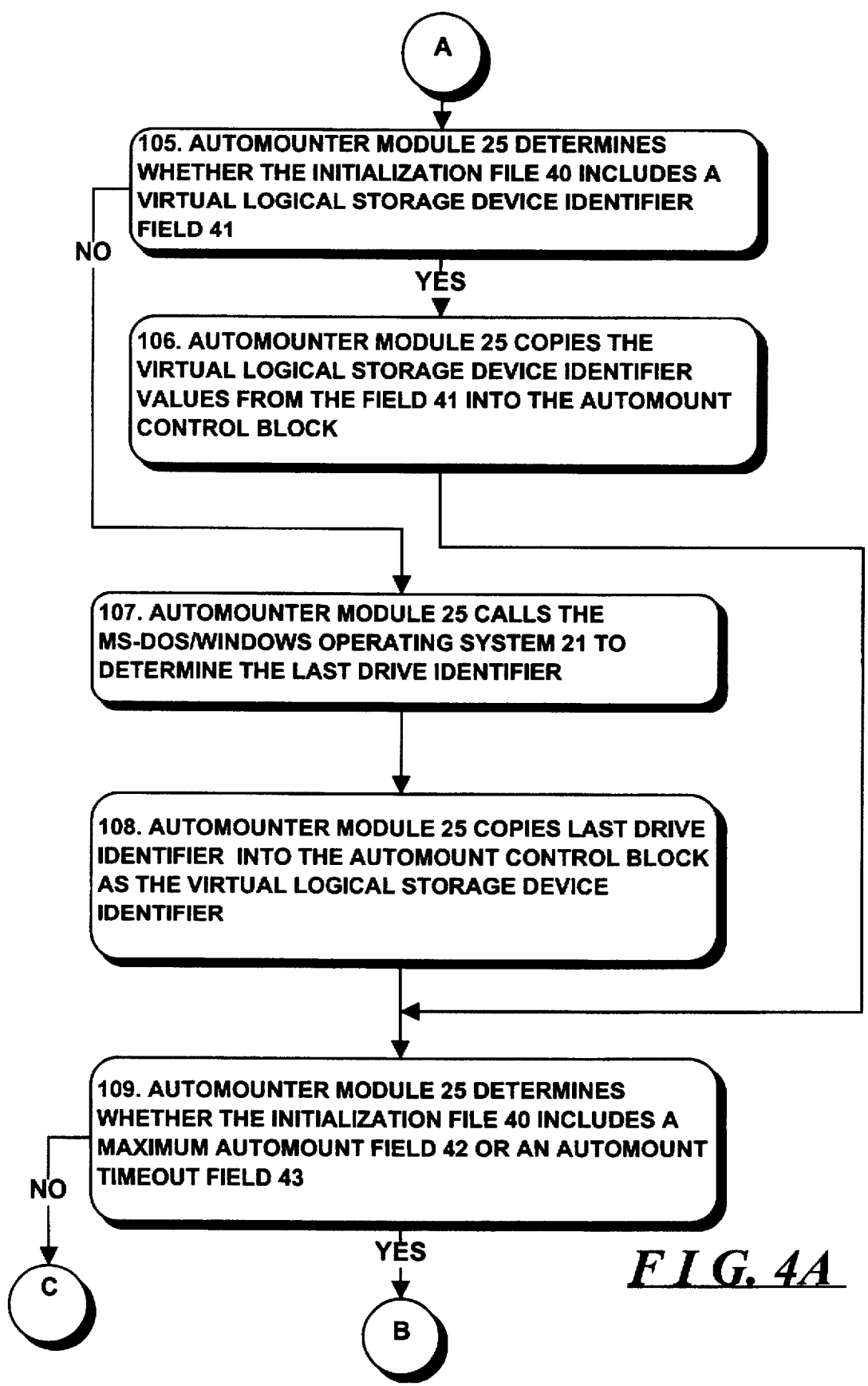
Figure 4B:
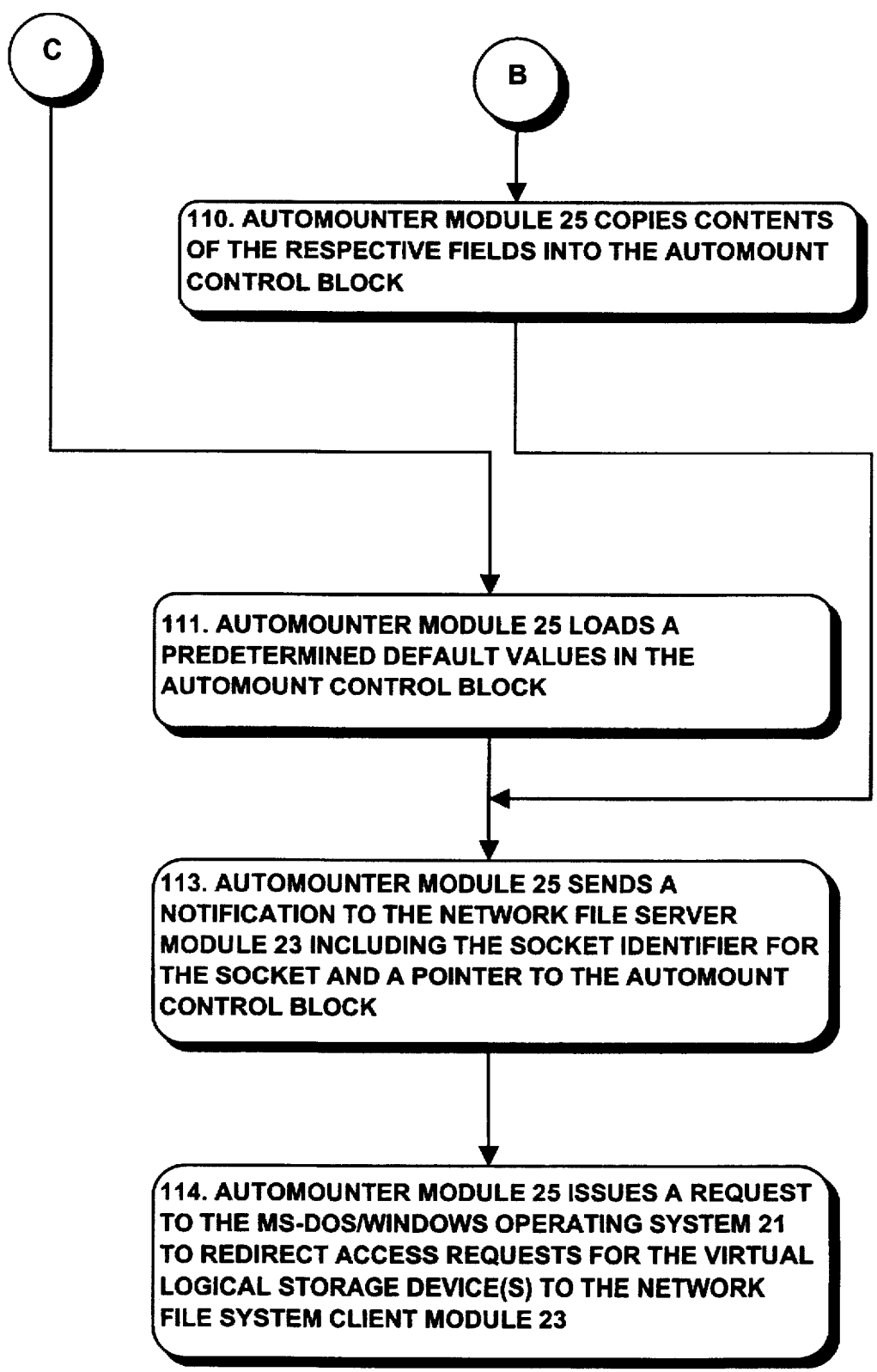
Figure 5:
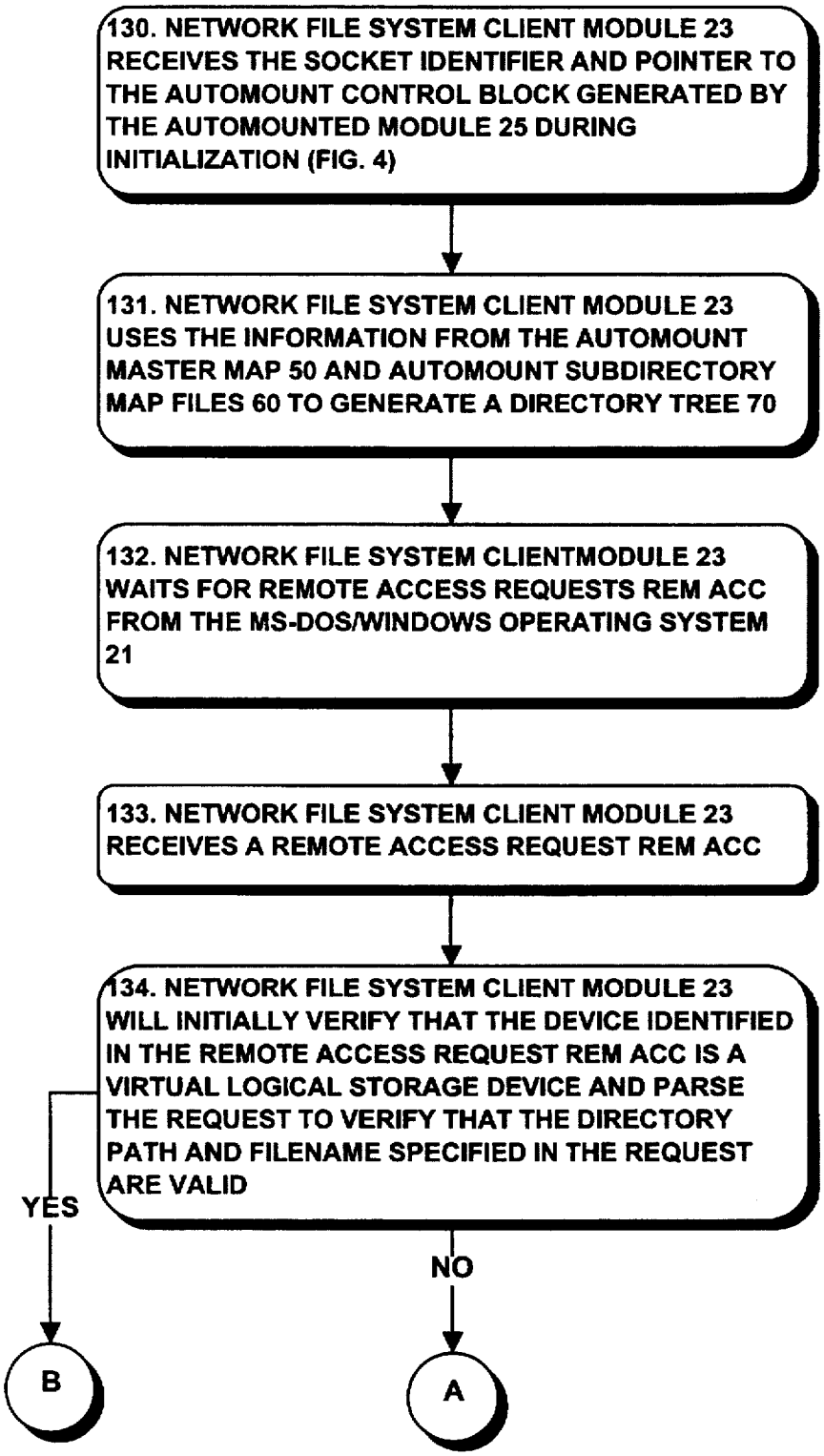
Figure 5A:
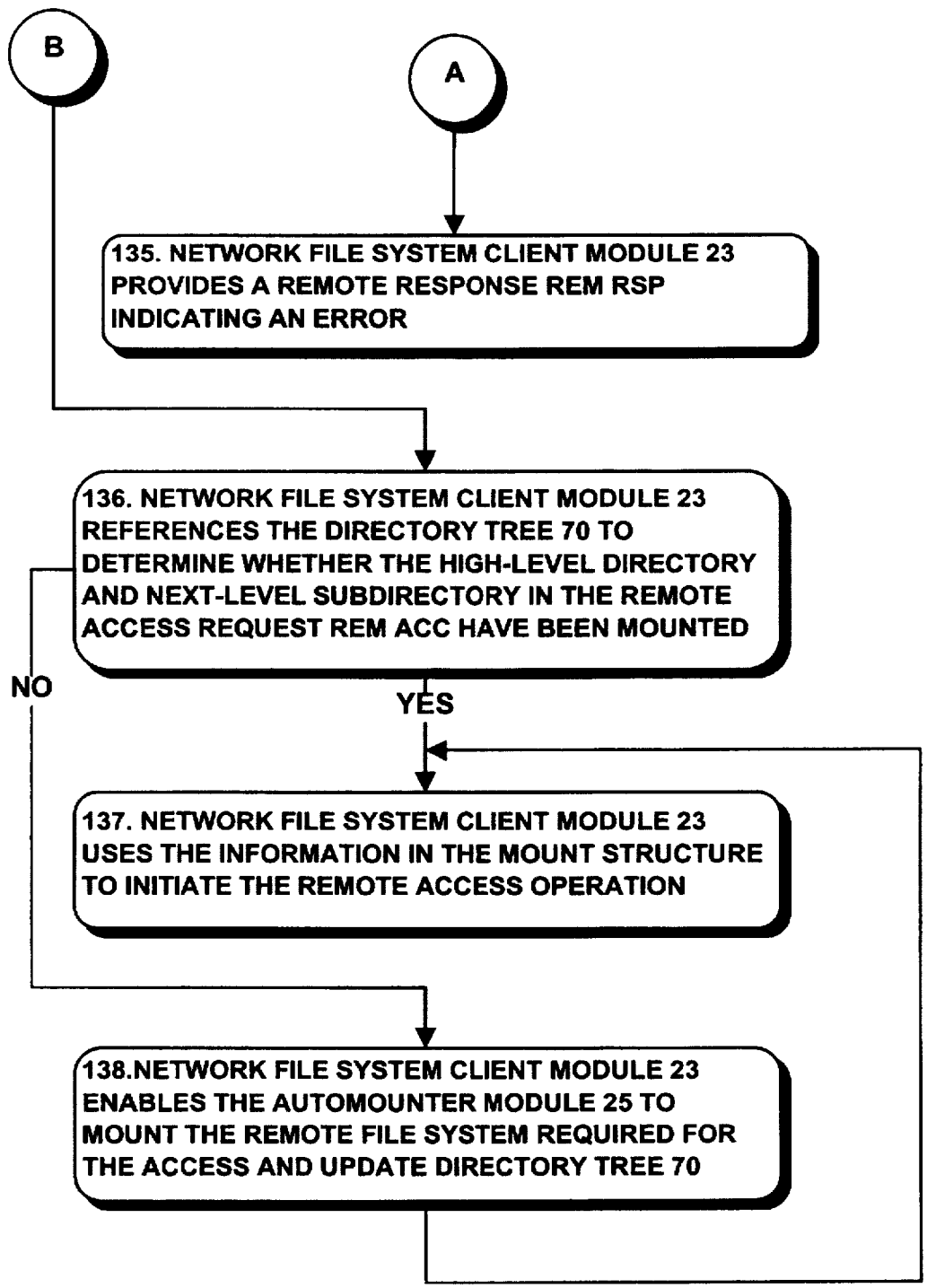
Figure 6:
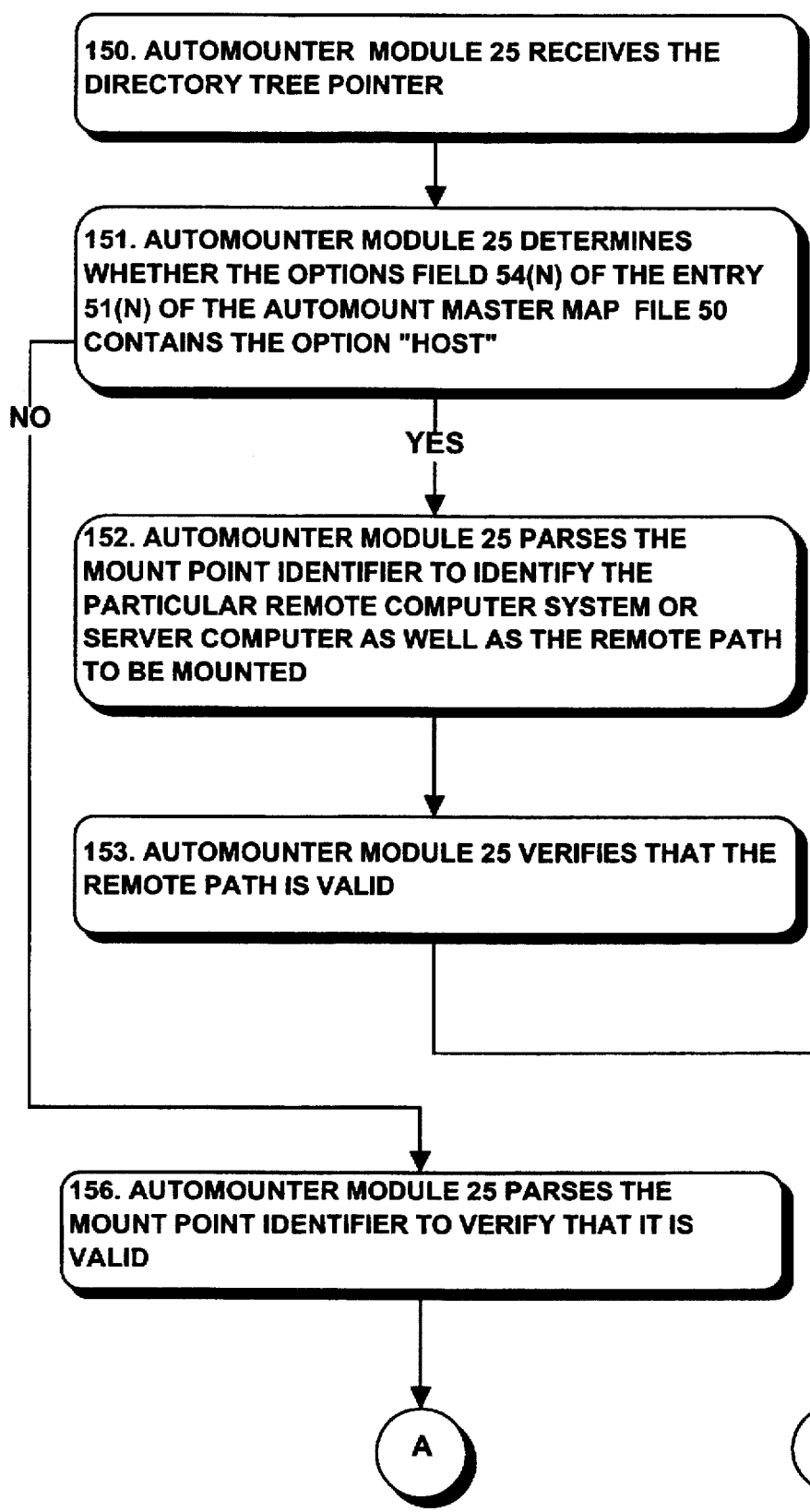

With this background, the operations performed by the network file system client module 23 and automounter 25 in connection with the invention will be described in connection with FIGS. 4 through 7. FIG. 4 depicts operations performed to initialize the automounter module 25, including generation of an automount control block which contains information that is provided to the network file system client module 23 and establishment of a connection used by the automounter module 25 for communicating with the network file system client module 23. FIG. 5 depicts operations performed by the network file system client module 23 in connection with remote access requests REM ACC from the MS-DOS/Windows operating system 21, including determining whether the portion of a virtual logical storage device's file system referenced in the remote access request has been mounted and, if not, issuing automount requests AUTOMNT REQ to the automounter module 25 to enable it (the automounter module 25) to perform the mount operation. FIG. 6 depicts operations performed by the automounter module 25 in response to automount requests AUTOMNT REQ which the network file system client module 23 may issue if the portion of the remote file system to be accessed has not been mounted.

Generally during initialization of the automounter module 25 (FIG. 4) a socket is created which serves to provide communications between the automounter module 25 and the network file system client module 23, and the automounter module 25 binds itself to one port of the socket. (a socket is a conventional communications structure and will not be described herein.) In addition, information is obtained from the various structures described above in connection with FIG. 3 and used in generating the automount control block, and a pointer to the automount control block is passed to the network file system client module 23. Finally, the MS-DOS/Windows operating system 21 is notified of the identifiers of the virtual logical storage devices and enabled to direct access requests which include the virtual logical storage device identifiers to the network file system client module 23. (Enabling the MS-DOS/Windows operating system 21 to redirect access requests is a conventional operation.)

More specifically, with reference initially to FIG. 4, during initialization the automounter module 25 first issues a request to the MS-DOS/Windows operating system 21 requesting establishment of a socket (step 100). If the MS-DOS/Windows operating system 21 establishes a suitable socket, it (the MS-DOS/Windows operating system 21) will provide a return value which is a socket identifier which the automounter module 25 may use in communicating with the network file system client module 23. On the other hand, if the MS-DOS/Windows operating system 21 is unable to establish a socket, it will provide a return value that corresponds to an error code. Accordingly, following step 100, the automounter module 25 will examine the return value to determine whether it is a socket identifier or an error code (step 101). If the automounter module 25 determines in step 101 that the return value is an error code, it will terminate with an appropriate message (step 102). On the other hand, if the automounter module 25 determines in step 101 that the return value is a socket identifier, it will use the socket identifier to retrieve selected information about the socket and bind itself to the socket (step 103).

Following step 103, the automounter module 25 will initialize the automount control block and pass the information therein to the network file system client module 23. In that operation, the automounter module 25 retrieves the contents of the automount master map 50 and loads it into the automount control block (step 104). In addition, the automounter module 25 determines whether the initialization file 40 includes a virtual logical storage device identifier field 41 (step 105) and if so copies the virtual logical storage device identifier values from the field 41 into the automount control block (step 106). On the other hand, if the automounter module 25 determines in step 105 that the initialization file 40 does not include a virtual logical storage device identifier field 41, the automounter module 25 will make a call to the MS-DOS/Windows operating system 21 to determine the last drive identifier (step 107), which it will then copy into the automount control block as the virtual logical storage device identifier (step 108).

Following either step 106 or step 108, the automounter module 25 will determine whether the initialization file 40 includes a maximum automount field 42 or an automount timeout field 43 (step 109), and if so will copy the contents of the respective fields into the automount control block (step 110). On the other hand, if the automounter module 25 determines in step 109 that the initialization file 40 does not include either or both of fields 42 or 43, it will sequence to step 111 to load a predetermined default value or values in the automount control block (step 112).

Following either step 110 or step 112, the automounter module 25 will send a notification to the network file system client module 23, including the socket identifier for the socket established in steps 100–103 and a pointer to the automount control block (step 113). In addition, the automounter module 25 will issue a request to the MS-DOSAWindows operating system 21 to redirect access requests for the virtual logical storage device(s) to the network file system client module 23 (step 114). Following step 114, initialization will be complete and the automounter module 25 will wait until it receives an automount request AUTOMNT REQ from the network file system client module 23. Operations performed by the automounter module 25 in response to an automount request AUTOMNT REQ from the network file system client module 25 will be described below in connection with FIG. 6.

Figure 7:
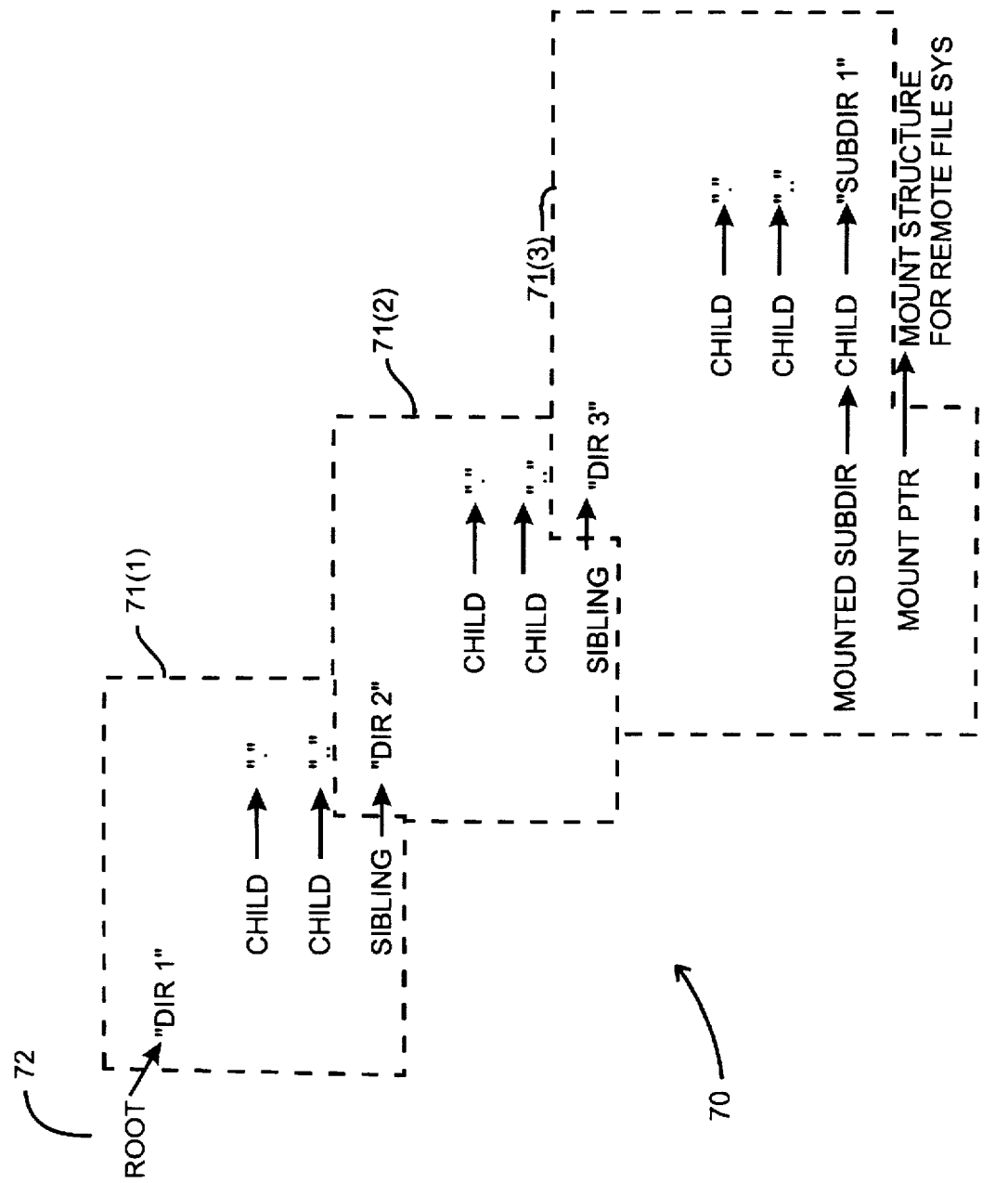
FIG. 7 depicts a data structure which is useful in understanding the operation of the network file system client module and automounter module depicted in FIG. 2.

Operations performed by the network file system client module 23 will be described in connection with FIG. 5. With reference to FIG. 5, the network file system client module 23 will receive the socket identifier and pointer to the automount control block generated by the automounted module 25 during initialization as described above in connection with FIG. 4 (step 130). After receiving the pointer to the automount control block in step 130, the network file system client module 23 will use the information from the automount master map 50 which was loaded into the automount control block by the automounter module 25 during initialization (FIG. 4), along with the subdirectories listed in the automount subdirectory map files 60 to generate a directory tree for the virtual logical storage devices (step 131). An illustrative tree 70 is depicted in FIG. 7. With reference to FIG. 7, the directory tree 70 includes a series of entries 71(1) through 71(N) (generally identified by reference numeral 71(n)). The first entry, identified as root entry 71(1) is pointed to by a root pointer 72. Each entry 71(n) includes the identification of the virtual logical storage device directory identified in the correspondingly-indexed entry 51(n) in the automounter master map 50, as well as its children, which corresponds to the subdirectories identified in the automount subdirectory map file 60 identified by the entry 51(1), as well as two child pseudo-directories which are provided by the MS-DOS/Windows operating system 21. (The two child pseudo-directories are the "." and ".." subdirectories. In FIG. 7, no real subdirectories are shown for the root entry 71(1) and entry 71(2)).

In addition, each entry 71(n) includes a "sibling" pointer to the entry 71(n+1) for the directory listed in the next entry 51(n+1) in the automount master map 50. (The "sibling" pointer for the last entry 71(N) will contain a null value, which will indicate that it is the last entry 71(N).) The entries 71(n) for the mountable subdirectories (that is, the real child subdirectories under each directory) provide mount information which is used by the network file system client module 23 in connection with remote accesses as will be described below. After generating the directory tree 70, the network file system client module 23 waits for remote access requests REM ACC from the MS-DOS/Windows operating system 21 (step 132). While waiting for remote access requests REM ACC from the MS-DOS/Windows operating system in step 132, the network file system client module 23 may perform selected housekeeping operations, such as enabling the automounter module 25 to unmounting remote file systems for which it (the network file system client module 23) has not received a remote access request REM ACC within a selected period of time.

When the MS-DOS/Windows operating system 21 receives an access request ACC REQ from an application program 20 which either explicitly or implicitly identifies a virtual logical storage device, it (the MS-DOS/Windows operating system 21) will issue a remote access request REM ACC to the network file system client module 23. When the network file system client module 23 receives a remote access request REM ACC (step 133) it will initially verify that the device identified in the remote access request REM ACC is a virtual logical storage device and parse the request to verify that the directory path and filename specified in the request are valid (step 134). In verifying that the device identified in the remote access request REM ACC is a virtual logical storage device, the network file system client module 23 will compare the device identifier in the remote access request REM ACC to the virtual logical storage device identifier(s) in the automount control block to verify that the device identifier in the remote access request REM ACC corresponds to a virtual logical storage device identifier in the automount control block. Similarly, in determining whether the remote host or directory path and filename specified in the request are valid, the network file system client module 23 can use characteristics such as permitted naming conventions to verify that the name of each host or directory in the path and the filename in the remote access request are valid. If the network file system client module 23 makes a negative determination in step 134 (that is, if it determines that the device identifier in the remote access request REM ACC is not a virtual logical storage device identifier or that the host or subdirectory and file name are not valid), it provides a remote response REM RSP indicating an error (step 135).

On the other hand, if the network file system client module 23 makes a positive determination in step 134 (that is, if it determines that the device identifier in the remote access request REM ACC is a virtual logical storage device identifier), it will reference the directory tree 70 to determine whether the high-level directory and next-level subdirectory in the remote access request REM ACC have been mounted (step 136). If the high-level directory and next-level subdirectory have been mounted, the directory tree 70 will contain a mount pointer to a mount structure for the remote file system corresponding to the portion of the virtual logical storage device's file system. If the network file system client module 23 makes a positive determination in step 136, it will use the information in the mount structure to initiate the remote access operation with the remote computer system 11(n') (n'≠n) or server computer 12 (step 137). The specific operations performed by the network file system client module 23 and the remote computer system 11(n') (n'≠n) or server computer 12 in connection with the remote access operation will depend on the specific type of access operation. For example, if the access operation is a file open or close operation, the network file system client module 23 will generate, and the network interface 24 will transfer over communication link 14, one or more messages to the remote computer system 11(n') (n'≠n) or server computer 12 to enable it to open or close the specified file.

On the other hand, if the access operation is a read operation, the network file system client module 23 will generate, and network interface 24 will transfer, one or more messages to the remote computer system 11(n') (n'≠n) or server computer 12 including a read request. In response, the remote computer system 11(n') (n'≠n) or server computer 12 will read the information from the file as specified in the read request, and in one or more messages transferred over communication link 14 transfer the information to the network file system client module 23. After receiving the information, the network file system client module 23 may provide the information to the MS-DOS/Windows operating system 21, which, in turn, will provide the information to the requesting application program 20.

Finally, if the access operation is a write operation, the network file system client module 23 will generate, and the network interface 24 will transfer one or more messages to the remote computer system 11(n') (n'≠n) or server computer 12 including a write request, and the data to be written. In response, the remote computer system 11(n') (n'≠n) or server computer 12 will store the data in the file as specified in the write request. The network file system client module 23 may initiate other access operations by generating and enabling the network interface 24 to transfer messages to the remote computer system 11(n') (n'≠n) or server computer 12 in a similar manner. After the remote access operation has been completed, the network file system client module 23 will return to step 132 to wait for the next remote access request REM ACC.

Returning to step 136, if the network file system client module 23 makes a negative determination in that step, that is, if it determines that the high-level directory and next-level subdirectory in the remote access request REM ACC have not been mounted, it will sequence to step 138 to enable the automounter module 25 to mount the remote file system required for the access. Communications between the network file system client module 23 and the automounter module 25 will be over the socket established in step 103 above. The operations performed by the automounter module 25 in connection with step 138 will be described in FIG. 6. After the automounter module 25 has completed the mount operation, it (the automounter module 25) will provide a mount structure for the high-level directory and next-level subdirectory, which the network file system client module 23 can load into the directory tree 70. Following step 138, the network file system client module 23 can sequence to step 137 to initiate the remote access using the mount information it just loaded into the directory tree 70.

The operations performed by the automounter module 25 in connection with mounting of a remote file system, or portion thereof, will be described in connection with FIG. 6. When initiating an automount operation by the automounter module 25, the network file system client module 23 will provide a pointer to the directory tree 70. Accordingly, with reference to FIG. 6, the automounter module 25 will initially receive the directory tree pointer over the socket established in step 103 (FIG. 4), as well as the identification of the mount point (that is, the subdirectory) which is to be mounted (step 150). After receiving this information from the network file system client module 23, the automounter module 25 will initially perform a number of steps to verify that the mount point as provided by the network file system client module 23. In that operation, the automounter module 25 will parse the mount point provided by the network file system client module 23 to verify that the structure of the mount point identifier is valid and, if so, exchange one or more messages over the network with the remote computer system 11(n') (n'≠n) or the server computer 12 which maintains the portion of the remote file system identified by the remote file system pointed to by the mount point identifier to perform the mount.

In particular, to determine whether the subdirectory name fields 62(m) of the automount subdirectory map file 60 contains remote host identifiers or subdirectory names, the automounter will first determine whether the options field 54(n) of the entry 51(n) of the automount master map file 50 contains the option "HOST" (step 151). As noted above, if the entry contains the option "HOST," each of the subdirectories identified in the subdirectory name fields 62(m) of the automounter subdirectory map file 60 contains a host name, that is, the identification of a remote computer system 11(n') (n'≠n) or server computer 12, and a directory path. Since the structures of the computer system identifiers do not need to conform to the operating system's directory and file name structural requirements, the automounter module 25 will perform different operations to verify the validity of the mount point identifier's structure. Accordingly, if the automounter module 25 makes a positive determination in step 151, it will sequence to step 152 to parse the mount point identifier to identify the particular remote computer system 11(n') (n'≠n) or server computer 12 as well as the remote path, that is directory name of the file system on the remote computer system 11(n') (n'≠n) or server computer 12 which is to be mounted. The automounter module 25 then verifies that the remote path is valid, which may require it to exchange messages with the remote computer system 11(n') (n'≠n) or server computer 12 over the communication link 14 through the network interface 24 (step 153). If the automounter module 25 determines in step 153 that the path is invalid, it will return an error to the network file system client module 23.

Returning to step 151, if the automounter module 25 makes a negative determination in that step, the mount point identifier does not include a host name. In that case, the automounter module 25 will sequence to step 156 to parse the mount point identifier to verify that it conforms to the operating system's path- and filename structural requirements. If the automounter module 25 makes a negative determination in that step, it will sequence to step 157 to use the mount point identifier to identify an entry 51(n) in the automount master map 50 and an appropriate entry 61(m) in the automount subdirectory map file 60 to locate determine the appropriate remote file system identifier for the mount operation.

Following either step 153 (if the automounter makes a negative determination in that step) or step 157, the automounter module 25 will sequence to step 160 to actually perform the mount operation in connection with the remote computer system 11(n') (n'≠n) or server computer 12, and thereafter will return to the network file system client module 23. In that operation, the automounter module 25, using the network interface 24, will exchange messages over communication link 14 to enable the remote computer system 11(n') (n'≠n) or the server computer 12 to perform the mount in a conventional manner and will update the mount structure pointed to by the directory tree 70. If the automount operation is successful the automounter module 25 will return to the network file system client module 23 (step 161), which, in turn, will perform the remote access operation as described above. If, on the other hand, the automount operation is not successful within the time period established by the timeout value defined by automount timeout field 43, the automounter module will provide an appropriate message to the network file system client module 23, which, in turn, can initiate appropriate error recovery operations.

The invention provides a number of advantages. For example, it provides an arrangement for automounting remote file systems for use in connection with operating systems, such as the Microsoft MS-DOS and Windows operating systems, which require explicit identification of storage devices to identify a file system. By providing that certain device names can be automounted remote devices, it is readily apparent from device identifiers in the access requests ACC REQ which access requests from the application programs 20 are local requests and which are remote requests to be serviced by the network file system client module 23.

In addition, by providing the "HOST" option above, the invention provides an arrangement whereby, for example, entire file systems on remote computer systems 11(n') (n'≠n) and/or the server computer 12 can be mounted and appear as subdirectories of one or more top-level directories for the computer system 11(n). Thus, all or a selected subset of the file systems for remote computers system 11(n') (n'≠n) and/or the server computer 12 can be mounted as a single automount drive. In operating systems such as MS-DOS and Windows for which the number of devices that a computer system 11(n) can access is limited (MS-DOS and Windows, for example, require that each device have a single alphabetical character "a," "b," etc., as their identifiers), the remote devices that can be treated as subdirectories on a single device, namely, the virtual logical storage device, instead of separate devices.

Furthermore, the invention provides an arrangement by which a number of virtual logical storage devices, each having a unique identifier, can be used to identify the same physical mass storage subsystem or subsystems. The individual virtual logical storage devices can have different current default paths and directories so that different parts of the same physical file system can be easily accessed using the default directories merely by selecting the appropriate virtual logical storage device.

Moreover, it will be appreciated that, although the invention in one embodiment has been described in connection with virtual logical storage device file systems comprising remote file systems maintained on remote computer systems 11(n') (n'≠n) or the server computer 12, the virtual logical storage device file systems may also include some or all of the local file system maintained by the computer system 11(n).

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A virtual file system accessing subsystem for use in connection with a computer system connected in a computer network, the computer system running a selected operating system, the virtual file system accessing subsystem facilitating accessing of a virtual logical storage device that is identified by a virtual logical storage device identifier and that has a virtual logical storage device file system that includes at least a portion of a remote file system maintained by another device connected in the computer network, the virtual file system accessing subsystem comprising:

A. a remote access element for initiating an access operation in connection with the virtual logical storage device file system maintained by the virtual logical storage device in response to an access request that the remote access element receives from the operating system which includes the virtual logical storage device identifier, the remote access element during the access operation accessing the portion of said remote file system that is included in said virtual logical storage device file system; and B. an operating system request redirector for enabling the operating system to direct access requests which identify the virtual logical storage device to the remote access element.

2. A virtual file system accessing subsystem as defined in claim 1 in which the virtual logical storage device file system comprises a plurality of portions of a remote file system maintained by said another device, each access request further including a remote file system portion identifier identifying one of said remote file system portions, the remote access element in response to an access request initiating an access operation in connection with the remote file system portion identified in the access request.

3. A virtual file system accessing subsystem as defined in claim 1 in which the virtual logical storage device file system includes at least one portion of a remote file system each maintained by one of a plurality of other devices connected in said network, each access request further including a remote file system portion identifier identifying one of said remote file system portions, the remote access element in response to an access request initiating an access operation in connection with the one of the other devices which maintains the remote file system portion identified in the access request.

4. A virtual file system accessing subsystem as defined in claim 1 in which the operating system comprises the MS-DOS and Windows operating systems.

5. A virtual file system accessing subsystem as defined in claim 1 in which the network is architected according to a client/server network architecture model, said another device comprising a server device, the computer system comprising a client device, the remote access element comprising a network file system client element.

6. A virtual file system accessing subsystem as defined in claim 1 in which the operating system request redirector comprises:

A. a virtual logical storage device information store for storing virtual logical storage device information including at least one virtual logical storage device identifier;

B. an operating system redirection enabler for retrieving the virtual logical storage device identifier from the virtual logical storage device information store and providing the virtual logical storage device identifier to the operating system thereby to enable the operating system to redirect access requests identifying the virtual logical storage device identifier to the remote access element.

7. A virtual file system accessing subsystem as defined in claim 6 in which the virtual logical storage device information store stores a plurality of virtual logical storage device identifiers, the operating system redirection enabler retrieving said plurality of virtual logical storage device identifiers from the virtual logical storage device information store and providing them to the operating system, thereby to enable the operating system to redirect access requests identifying any of the virtual logical storage device identifiers to the remote access element.

8. A virtual file system accessing subsystem as defined in claim 6 in which the virtual logical storage device information store further stores directory information including at least one directory identifier and an associated remote file system identifier, the remote file system identifier identifying a said portion of a said remote file system, the remote access element using the remote file system identifier to identify said another device in initiating the access operation.

9. A virtual file system accessing subsystem as defined in claim 8 in which an access request includes path information identifying a path through a hierarchical directory system, the remote access element in response to a said access request using the path information to identify a directory to be accessed and the remote file system associated with the directory to be accessed, the remote access element initiating an access operation in connection with the identified remote file system over the network in response to the access request.

10. A virtual file system accessing subsystem as defined in claim 8 in which the directory information stored by said virtual logical storage device information store includes a plurality of directory identifiers, at least some of said directory identifiers having at least one subdirectory identifier, each subdirectory identifier having an associated remote file system identifier, each remote file system identifier identifying a said portion of a said remote file system, the remote access element using the remote file system identifiers to identify other devices connected in said network in initiating the access operation.

11. A virtual file system accessing subsystem as defined in claim 10 in which an access request includes path information identifying a path through a hierarchical directory system, the remote access element in response to a said access request using the path information to identify a directory and subdirectory to be accessed in response to the access request and the remote file system associated with the subdirectory to be accessed, the remote access element in response to the access request initiating an access operation in connection with the identified remote file system over the network.

12. A virtual file system accessing subsystem as defined in claim 11 in which at least some access requests do not include path information, and further in which the virtual logical storage device information store stores a plurality of virtual logical storage device identifiers, and the operating system redirection enabler enabling the operating system to redirect access requests identifying any of the virtual logical storage device identifiers to the remote access element, the operating system further providing a default directory associated with each virtual logical storage device identifier, the remote access element using the default directory in response to access requests which does not include path information.

13. A virtual file system accessing subsystem as defined in claim 12 in which the default directory is selectable by an application program.

14. A virtual file system accessing subsystem as defined in claim 10 in which, for at least one directory, each subdirectory identifier corresponds to a remote file system identifier for a remote file system provided by a said other device connected to said network, thereby enabling the remote file system to be accessed using the virtual logical storage device identifier.

15. A virtual file system accessing subsystem as defined in claim 1 in which said remote file system portion has an associated mount status, the remote access element prior to initiating a said access operation determining if the mount status indicates that the remote file system portion is mounted to said virtual logical storage device file system and (i) if so, initiating the access operation, (ii) if not, enabling an automounter element to perform a mount operation if the mount status indicates that the remote file system portion is not mounted to said virtual logical storage device file system.

16. A virtual file system accessing subsystem as defined in claim 15 in which, if the automounter element indicates that a mount operation is successful, the remote access element initiates a said access operation in connection with the mounted remote file system portion.

17. A method of accessing a virtual file system in a computer system connected in a computer network, the computer system running a selected operating system, the method facilitating the accessing of a virtual logical storage device that is identified by a virtual logical storage device identifier and that has a virtual logical storage device file system that includes at least a portion of a remote file system maintained by another device connected in the computer network, the method comprising the steps of:

A. enabling the operating system to direct access requests which identify the virtual logical storage device to the remote access element; and B. enabling a remote access element to initiate an access operation in connection with the virtual logical storage device file system maintained by the virtual logical storage device in response to an access request that the remote access element receives from the operating system which includes the virtual logical storage device identifier, the remote access element during the access operation accessing the portion of said remote file system that is included in said virtual logical storage device file system.

18. A method as defined in claim 17 in which the virtual logical storage device file system comprises a plurality of portions of a remote file system maintained by said another device, each access request further including a remote file system portion identifier identifying one of said remote file system portions, the remote access element enabling step including the step of, in response to an access request, initiating an access operation in connection with the remote file system portion identified in the access request.

19. A method as defined in claim 17 in which the virtual logical storage device file system includes at least one portion of a remote file system each maintained by one of a plurality of other devices connected in said network, each access request further including a remote file system portion identifier identifying one of said remote file system portions, the remote access element enabling step including the step of, in response to an access request, initiating an access operation in connection with the one of the other devices which maintains the remote file system portion identified in the access request.

20. A method as defined in claim 17 in which the operating system comprises the MS-DOS and Windows operating systems.

21. A method as defined in claim 17 in which the network is architected according to a client/server network architecture model, said another device comprising a server device, the computer system comprising a client device, the remote access element comprising a network file system client element.

22. A method as defined in claim 17 in which the operating system request redirection step includes the steps of:
A. providing a virtual logical storage device information store for storing virtual logical storage device information including at least one virtual logical storage device identifier;
B. retrieving the virtual logical storage device identifier from the virtual logical storage device information store and providing the virtual logical storage device identifier to the operating system thereby to enable the operating system to redirect access requests identifying the virtual logical storage device identifier to the remote access element.

23. A method as defined in claim 22 in which the virtual logical storage device information store stores a plurality of virtual logical storage device identifiers, the operating system redirection enabling step including the steps of:
A. retrieving said plurality of virtual logical storage device identifiers from the virtual logical storage device information store and
B. providing the retrieved plurality of virtual logical storage device identifiers to the operating system, thereby to enable the operating system to redirect access requests identifying any of the virtual logical storage device identifiers to the remote access element.

24. A method as defined in claim 23 in which the virtual logical storage device information store further stores directory information including at least one directory identifier and an associated remote file system identifier, the remote file system identifier identifying a said portion of a said remote file system, the remote access element enabling step including the step of being using the remote file system identifier to identify said another device in initiating the access operation.

25. A method as defined in claim 24 in which an access request includes path information identifying a path through a hierarchical directory system, the remote access element in response to a said access request using the path information to identify a directory to be accessed and the remote file system associated with the directory to be accessed, the remote access element enabling step including the step of initiating an access operation in connection with the identified remote file system over the network in response to the access request.

26. A method as defined in claim 24 in which the directory information stored by said virtual logical storage device information store includes a plurality of directory identifiers, at least some of said directory identifiers having at least one subdirectory identifier, each subdirectory identifier having an associated remote file system identifier, each remote file system identifier identifying a said portion of a said remote file system, the remote access element enabling step including the step of using the remote file system identifiers to identify other devices connected in said network in initiating the access operation.

27. A method as defined in claim 26 in which an access request includes path information identifying a path through a hierarchical directory system, the remote access element in response to a said access request using the path information to identify a directory and subdirectory to be accessed in response to the access request and the remote file system associated with the subdirectory to be accessed, the remote access element enabling step including the step of initiating an access operation in response to a said access request in connection with the identified remote file system over the network.

28. A method as defined in claim 27 in which at least some access requests do not include path information, and further in which the virtual logical storage device information store stores a plurality of virtual logical storage device identifiers, and the operating system redirection enabling step including the step of enabling the operating system to redirect access requests identifying any of the virtual logical storage device identifiers to the remote access element, the operating system further providing a default directory associated with each virtual logical storage device identifier, the remote access element enabling step including the step of using the default directory in response to access requests which does not include path information.

29. A method as defined in claim 28 in which the default directory is selectable by an application program.

30. A method as defined in claim 26 in which, for at least one directory, each subdirectory identifier corresponds to a remote file system identifier for a remote file system provided by a said other device connected to said network, thereby enabling the remote file system to be accessed using the virtual logical storage device identifier.

31. A method as defined in claim 17 in which said remote file system portion has an associated mount status, the remote access element prior to initiating a said access operation being enabled to determine if the mount status indicates that the remote file system portion is mounted to said virtual logical storage device file system and (i) if so, initiate the access operation, (ii) if not, enable an automounter element to perform a mount operation if the mount status indicates that the remote file system portion is not mounted to said virtual logical storage device file system.

32. A method as defined in claim 31 in which, if the automounter element indicates that a mount operation is successful, the remote access element enabling step includes the step of initiating a said access operation in connection with the mounted remote file system portion.

33. A virtual file system accessing subsystem computer program product for use in connection with a computer connected in a computer network, the computer system running a selected operating system, the virtual file system accessing subsystem facilitating accessing of a virtual logical storage device that is identified by a virtual logical storage device identifier and that has a virtual logical storage device file system that includes at least a portion of a remote file system maintained by another device connected in the computer network, the virtual file system accessing subsystem computer program product comprising a computer usable medium having computer system readable code embodied therein, the computer system readable code comprising:

- A. remote access element code devices for enabling the computer to initiate an access operation in connection with the virtual logical storage device file system maintained by the virtual logical storage device in response to an access request received from the operating system which includes the virtual logical storage device identifier, the remote access element enabling the computer during the access operation to access the portion of said remote file system that is included in said virtual logical storage device file system; and
- B. operating system request redirector code devices for enabling computer to, in turn, enable the operating system to direct access requests which identify the virtual logical storage device for processing in response to the remote access element code devices.

34. A virtual file system accessing subsystem computer program product as defined in claim 33 in which the virtual logical storage device file system comprises a plurality of portions of a remote file system maintained by said another device, each access request further including a remote file system portion identifier identifying one of said remote file system portions, the remote access element code devices enabling the computer to, in response to an access request, initiate an access operation in connection with the remote file system portion identified in the access request.

35. A virtual file system accessing subsystem computer program product as defined in claim 33 in which the virtual logical storage device file system includes at least one portion of a remote file system each maintained by one of a plurality of other devices connected in said network, each access request further including a remote file system portion identifier identifying one of said remote file system portions, the remote access element code devices enabling the computer to, in response to an access request, initiate an access operation in connection with the one of the other devices which maintains the remote file system portion identified in the access request.

36. A virtual file system accessing subsystem computer program product as defined in claim 33 in which the operating system comprises the MS-DOS and Windows operating systems.

37. A virtual file system accessing subsystem computer program product as defined in claim 33 in which the network is architected according to a client/server network architecture model, said another device comprising a server device, the computer system comprising a client device, the remote access element code devices comprising network file system client code devices.

38. A virtual file system accessing subsystem computer program product as defined in claim 33 in which the operating system request redirector code devices comprise:

- A. virtual logical storage device information store code devices for enabling the computer to store virtual logical storage device information including at least one virtual logical storage device identifier;
- B. operating system redirection enabler code devices for enabling the computer to retrieve the virtual logical storage device identifier from the virtual logical storage device information store and provide the virtual logical storage device identifier for use by the operating system thereby to enable the operating system to redirect access requests identifying the virtual logical storage device identifier for processing in response to the remote access element.

39. A virtual file system accessing subsystem computer program product as defined in claim 38 in which the virtual logical storage device information store code devices enables the computer to store a plurality of virtual logical storage device identifiers, the operating system redirection enabler code devices enabling the computer to retrieve said plurality of virtual logical storage device identifiers from the virtual logical storage device information store and provide them for processing in response to the operating system, thereby to enable the redirection access requests identifying any of the virtual logical storage device identifiers for processing in response to the remote access element.

40. A virtual file system accessing subsystem computer program product as defined in claim 38 in which the virtual logical storage device information store code devices further enable the computer to store directory information including at least one directory identifier and an associated remote file system identifier, the remote file system identifier identifying a said portion of a said remote file system, the remote access element code devices enabling the computer to use the remote file system identifier to identify said another device in initiating the access operation.

41. A virtual file system accessing subsystem computer program product as defined in claim 40 in which an access request includes path information identifying a path through a hierarchical directory system, the remote access element code devices enabling the computer to, in response to a said access request using the path information, identify a directory to be accessed and the remote file system associated with the directory to be accessed, and initiate an access operation in connection with the identified remote file system over the network in response to the access request.

42. A virtual file system accessing subsystem computer program product as defined in claim 40 in which the directory information stored by the computer in response to processing of said virtual logical storage device information store code devices includes a plurality of directory identifiers, at least some of said directory identifiers having at least one subdirectory identifier, each subdirectory identifier having an associated remote file system identifier, each remote file system identifier identifying a said portion of a said remote file system, the remote access element code devices enabling the computer to use the remote file system identifiers to identify other devices connected in said network in initiating the access operation.

43. A virtual file system accessing subsystem computer program product as defined in claim 42 in which an access request includes path information identifying a path through a hierarchical directory system, the remote access element code devices enabling the computer to, in response to a said access request, use the path information to identify a directory and subdirectory to be accessed in response to the access request and the remote file system associated with the subdirectory to be accessed, and further to initiate an access operation in connection with the identified remote file system over the network.

44. A virtual file system accessing subsystem computer program product as defined in claim 43 in which at least some access requests do not include path information, and further in which the virtual logical storage device information store code devices enable the computer to store a plurality of virtual logical storage device identifiers, and the operating system redirection enabler code devices enabling the computer to, in turn, enable the operating system to redirect access requests identifying any of the virtual logical storage device identifiers for processing in response to the remote access element code devices, the operating system further providing a default directory associated with each virtual logical storage device identifier, the remote access element code devices enabling the computer to use the default directory in response to access requests which doe not include path information.

45. A virtual file system accessing subsystem computer program product as defined in claim 44 in which the default directory is selectable by an application program.

46. A virtual file system accessing subsystem computer program product as defined in claim 44 in which, for at least one directory, each subdirectory identifier corresponds to a remote file system identifier for a remote file system provided by a said other device connected to said network, thereby enabling the remote file system to be accessed using the virtual logical storage device identifier.

47. A virtual file system accessing subsystem computer program product as defined in claim 33 in which said remote file system portion has an associated mount status, the remote access element code devices enable the computer, prior to initiating a said access operation, to determine if the mount status indicates that the remote file system portion is mounted to said virtual logical storage device file system and (i) if so, initiate the access operation, (ii) if not, initiate processing in response to automounter element code devices to perform a mount operation if the mount status indicates that the remote file system portion is not mounted to said virtual logical storage device file system.

48. A virtual file system accessing subsystem computer program product as defined in claim 47 in which, if the computer determines, while processing the automounter element code devices, that a mount operation is successful, the remote access element code devices enable the computer to initiate a said access operation in connection with the mounted remote file system portion.

49. A virtual file system accessing subsystem for use in connection with a computer system connected in a computer network, the computer system running a selected operating system, the virtual file system accessing subsystem facilitating accessing of a plurality of virtual logical storage devices each identified by a virtual logical storage device identifier, each virtual logical storage device having a virtual logical storage device file system including at least a portion of a remote file system maintained by another device connected in the computer network, at least some virtual logical storage device file systems including a hierarchical directory system defining a plurality of possible paths each having a path identifier, with at least one of the virtual logical storage device file systems that include hierarchical directory systems having an associated default path comprising one of said possible paths, the virtual file system accessing subsystem comprising:

A. a remote access element for initiating an access operation in connection with the virtual logical storage device file system maintained by the virtual logical storage device in response to access requests received from the operating system which include the virtual logical storage device identifier and a said path identifier, the remote access element during the access operation accessing the portion of said remote file system that is included in said virtual logical storage device file system along the path identified by the path identifier; and B. an operating system request redirector for enabling the operating system to direct access requests received from an application program which identify a said virtual logical storage device to the remote access element, the operating system receiving access requests from a said application program and providing to the remote access element those access requests which include the virtual logical storage device identifier along with, for ones of the access requests received from the application program which do not include a path identifier, a path identifier for the default path for the virtual logical storage device identified by the virtual logical storage device.

50. A virtual file system accessing subsystem as defined in claim 49 in which the virtual logical storage device file systems for the respective virtual logical storage devices each include the same portion of said remote file system portion, thereby to facilitate at least a plurality of the default paths associated with respective virtual logical storage device file systems to correspond to the same path in the remote file system portion.

51. A virtual file system accessing subsystem as defined in claim 49 in which the virtual logical storage device file system associated with at least one of said virtual logical storage device identifiers comprises a plurality of portions of a remote file system maintained by said another device, each access request including said at least one virtual logical storage device identifier further including a remote file system portion identifier identifying one of said remote file system portions, the remote access element in response to an access request initiating an access operation in connection with the remote file system portion identified in the access request.

52. A virtual file system accessing subsystem as defined in claim 49 in which the virtual logical storage device file system associated with at least one of said virtual logical storage device identifiers includes at least one portion of a remote file system each maintained by one of a plurality of other devices connected in said network, each access request including said at least one virtual logical storage device identifier further including a remote file system portion identifier identifying one of said remote file system portions, the remote access element in response to an access request initiating an access operation in connection with the one of the other devices which maintains the remote file system portion identified in the access request.

53. A virtual file system accessing subsystem as defined in claim 49 in which the operating system comprises the MS-DOS and Windows operating systems.

54. A virtual file system accessing subsystem as defined in claim 49 in which the network is architected according to a client/server network architecture model, said another device comprising a server device, the computer system comprising a client device, the remote access element comprising a network file system client element.

55. A virtual file system accessing subsystem as defined in claim 49 in which the operating system request redirector comprises:

A. a virtual logical storage device information store for storing virtual logical storage device information including each said virtual logical storage device identifier;

B. an operating system redirection enabler for retrieving the virtual logical storage device identifiers from the virtual logical storage device information store and providing the virtual logical storage device identifiers to the operating system thereby to enable the operating system to redirect access requests identifying the virtual logical storage device identifiers to the remote access element.

56. A virtual file system accessing subsystem as defined in claim 55 in which the virtual logical storage device information store further stores directory information including at least one directory identifier and an associated remote file system identifier, the directory identifier identifying a directory in a virtual logical storage device file system, the remote file system identifier identifying a said portion of a said remote file system, the remote access element using the remote file system identifier to identify said another device in initiating the access operation which identifies the directory.

57. A virtual file system accessing subsystem as defined in claim 55 in which the virtual logical storage device information store stores directory information including includes a plurality of directory identifiers, at least some of said directory identifiers having at least one subdirectory identifier, each subdirectory identifier having an associated remote file system identifier, each remote file system identifier identifying a said portion of a said remote file system, the remote access element using the remote file system identifiers to identify other devices connected in said network in initiating the access operation.

58. A virtual file system accessing subsystem as defined in claim 49 in which said remote file system portion has an associated mount status, the remote access element prior to initiating a said access operation determining if the mount status indicates that the remote file system portion is mounted to said virtual logical storage device file system and (i) if so initiating the access operation, (ii) if not enabling an automounter element to perform a mount operation if the mount status indicates that the remote file system portion is not mounted to said virtual logical storage device file system.

59. A virtual file system accessing subsystem as defined in claim 58 in which, if the automounter element indicates that a mount operation is successful, the remote access element initiates a said access operation in connection with the mounted remote file system portion.

60. A method of accessing a virtual file system in a computer system connected in a computer network, the computer system running a selected operating system, the method facilitating accessing of a plurality of virtual logical storage devices each identified by a virtual logical storage device identifier, each virtual logical storage device having a virtual logical storage device file system including at least a portion of a remote file system maintained by another device connected in the computer network, at least some virtual logical storage device file systems including a hierarchical directory system defining a plurality of possible paths each having a path identifier, with at least one of the virtual logical storage device file systems that include hierarchical directory systems having an associated default path comprising one of said possible paths, the method comprising the steps of:

A. enabling the operating system to direct access requests received from an application program which identify the virtual logical storage device to the remote access element, the operating system receiving access requests from a said application program and providing to a remote access element those access requests which include a said virtual logical storage device identifier along with, for ones of the access requests received from the application program which do not include a path identifier, a path identifier for the default path for the virtual logical storage device identified by the virtual logical storage device; and B. enabling the remote access element to initiate an access operation in connection with the virtual logical storage device file system maintained by the virtual logical storage device in response to access requests received from the operating system which include the virtual logical storage device identifier and a said path identifier, the remote access element during the access operation accessing the portion of said remote file system that is included in said virtual logical storage device file system along the path identified by the path identifier.

61. A method as defined in claim 60 in which the virtual logical storage device file systems for the respective virtual logical storage devices each include the same portion of said remote file system portion, thereby to facilitate at least a plurality of the default paths associated with respective virtual logical storage device file systems to correspond to the same path in the remote file system portion.

62. A method as defined in claim 60 in which the virtual logical storage device file system associated with at least one of said virtual logical storage device identifiers comprises a plurality of portions of a remote file system maintained by said another device, each access request that includes said at least one virtual logical storage device identifier further including a remote file system portion identifier identifying one of said remote file system portions, the remote access element enabling step including the step of, in response to an access request, initiating an access operation in connection with the remote file system portion identified in the access request.

63. A method as defined in claim 60 in which the virtual logical storage device file system associated with at least one of said virtual logical storage device identifiers includes at least one portion of a remote file system each maintained by one of a plurality of other devices connected in said network, each access request that includes said at least one virtual logical storage device identifier further including a remote file system portion identifier identifying one of said remote file system portions, the remote access element enabling step including the step of, in response to an access request, initiating an access operation in connection with the one of the other devices which maintains the remote file system portion identified in the access request.

64. A method as defined in claim 60 in which the operating system comprises the MS-DOS and Windows operating systems.

65. A method as defined in claim 60 in which the network is architected according to a client/server network architecture model, said another device comprising a server device, the computer system comprising a client device, the remote access element comprising a network file system client element.

66. A method as defined in claim 60 in which the operating system request redirection step comprises the steps of:

A. providing a virtual logical storage device information store for storing virtual logical storage device information including each said virtual logical storage device identifier;

B. retrieving the virtual logical storage device identifiers from the virtual logical storage device information store and providing the virtual logical storage device identifiers to the operating system thereby to enable the operating system to redirect access requests identifying the virtual logical storage device identifiers to the remote access element.

67. A method as defined in claim 66 in which the virtual logical storage device information store further stores directory information including at least one directory identifier and an associated remote file system identifier, the directory identifier identifying a directory in a virtual logical storage device file system, the remote file system identifier identifying a said portion of a said remote file system, the remote access element enabling step including the step of using the remote file system identifier to identify said another device in initiating the access operation which identifies the directory.

68. A method as defined in claim 66 in which the virtual logical storage device information store stores directory information including includes a plurality of directory identifiers, at least some of said directory identifiers having at least one subdirectory identifier, each subdirectory identifier having an associated remote file system identifier, each remote file system identifier identifying a said portion of a said remote file system, the remote access element enabling step including the step of using the remote file system identifiers to identify other devices connected in said network in initiating the access operation.

69. A method as defined in claim 60 in which said remote file system portion has an associated mount status, the remote access element prior to initiating a said access operation being enabled to determine if the mount status indicates that the remote file system portion is mounted to said virtual logical storage device file system and (i) if so, initiate the access operation, (ii) if not, enable an automounter element to perform a mount operation if the mount status indicates that the remote file system portion is not mounted to said virtual logical storage device file system.

70. A method as defined in claim 69 in which, if the automounter element indicates that a mount operation is successful, the remote access element enabling step includes the step of initiating a said access operation in connection with the mounted remote file system portion.

71. A virtual file system accessing subsystem computer program product for use in connection with a computer connected in a computer network, the computer system running a selected operating system, the virtual file system accessing subsystem facilitating accessing of a plurality of virtual logical storage devices each identified by a virtual logical storage device identifier, each virtual logical storage device having a virtual logical storage device file system including at least a portion of a remote file system maintained by another device connected in the computer network, at least some virtual logical storage device file systems including a hierarchical directory system defining a plurality of possible paths each having a path identifier, with at least one of the virtual logical storage device file systems that include hierarchical directory systems having an associated default path comprising one of said possible paths, the virtual file system accessing subsystem computer program product comprising a computer usable medium having computer system readable code embodied therein, the computer system readable code comprising:

A. remote access element code devices for enabling the computer to initiate an access operation in connection with the virtual logical storage device file system maintained by the virtual logical storage device in response to access requests received from the operating system which include the virtual logical storage device identifier and a said path identifier, the remote access element code devices enabling the computer, during the access operation, to access the portion of said remote file system that is included in said virtual logical storage device file system along the path identified by the path identifier; and B. operating system request redirector code devices for enabling the computer to, in turn, enable the operating system to direct access requests received from an application program which identify a said virtual logical storage device, for processing in response to the remote access element code devices, the operating system receiving access requests from a said application program and providing to the remote access element those access requests which include the virtual logical storage device identifier along with, for ones of the access requests received from the application program which do not include a path identifier, a path identifier for the default path for the virtual logical storage device identified by the virtual logical storage device.

72. A virtual file system accessing subsystem computer program product as defined in claim 71 in which the virtual logical storage device file systems for the respective virtual logical storage devices each include the same portion of said remote file system portion, thereby to facilitate at least a plurality of the default paths associated with respective virtual logical storage device file systems to correspond to the same path in the remote file system portion.

73. A virtual file system accessing subsystem computer program product as defined in claim 71 in which the virtual logical storage device file system associated with at least one of said virtual logical storage device identifiers comprises a plurality of portions of a remote file system maintained by said another device, each access request including said at least one virtual logical storage device identifier further including a remote file system portion identifier identifying one of said remote file system portions, the remote access element code devices enabling the computer to, in response to an access request, initiate an access operation in connection with the remote file system portion identified in the access request.

74. A virtual file system accessing subsystem computer program product as defined in claim 71 in which the virtual logical storage device file system associated with at least one of said virtual logical storage device identifiers includes at least one portion of a remote file system each maintained by one of a plurality of other devices connected in said network, each access request including said at least one virtual logical storage device identifier further including a remote file system portion identifier identifying one of said remote file system portions, the remote access element code devices enabling the computer do, in response to an access request, initiate an access operation in connection with the one of the other devices which maintains the remote file system portion identified in the access request.

75. A virtual file system accessing subsystem computer program product as defined in claim 71 in which the operating system comprises the MS-DOS and Windows operating systems.

76. A virtual file system accessing subsystem computer program product as defined in claim 71 in which the network is architected according to a client/server network architecture model, said another device comprising a server device, the computer system comprising a client device, the remote access element code devices comprising a network file system client element.

77. A virtual file system accessing subsystem computer program product as defined in claim 71 in which the operating system request redirector code devices comprise:

A. a virtual logical storage device information store code devices for enabling the computer to store virtual logical storage device information including each said virtual logical storage device identifier;

B. operating system redirection enabler code devices for enabling the computer to retrieve the virtual logical storage device identifiers from the virtual logical storage device information store and provide the virtual logical storage device identifiers for use in processing by the operating system, thereby to enable the operating system to enable the computer to redirect access requests identifying the virtual logical storage device identifiers to the remote access element.

78. A virtual file system accessing subsystem computer program product as defined in claim 77 in which the virtual logical storage device information store further stores directory information including at least one directory identifier and an associated remote file system identifier, the directory identifier identifying a directory in a virtual logical storage device file system, the remote file system identifier identifying a said portion of a said remote file system, the remote access element code devices enabling the computer to use the remote file system identifier to identify said another device in initiating the access operation which identifies the directory.

79. A virtual file system accessing subsystem computer program product as defined in claim 77 in which the virtual logical storage device information store stores directory information including includes a plurality of directory identifiers, at least some of said directory identifiers having at least one subdirectory identifier, each subdirectory identifier having an associated remote file system identifier, each remote file system identifier identifying a said portion of a said remote file system, the remote access element enabling the computer to use the remote file system identifiers to identify other devices connected in said network in initiating the access operation.

80. A virtual file system accessing subsystem computer program product as defined in claim 71 in which said remote file system portion has an associated mount status, the remote access element code devices enable the computer, prior to initiating a said access operation, to determine if the mount status indicates that the remote file system portion is mounted to said virtual logical storage device file system and (i) if so, initiate the access operation, (ii) if not, initiate processing in response to automounter element code devices to perform a mount operation if the mount status indicates that the remote file system portion is not mounted to said virtual logical storage device file system.

81. A virtual file system accessing subsystem computer program product as defined in claim 80 in which, if the computer determines, while processing the automounter element code devices, that a mount operation is successful, the remote access element code devices enable the computer to initiate a said access operation in connection with the mounted remote file system portion.

82. A virtual file system accessing subsystem for use in connection with a computer system connected in a computer network, the computer system running a selected operating system, the virtual file system accessing subsystem facilitating accessing of a virtual logical storage device that is identified by a virtual logical storage device identifier and that has a virtual logical storage device file system that includes an identifier identifying at least a portion of a remote file system maintained by another device connected in the computer network, the virtual file system accessing subsystem comprising:

A. a remote access element for initiating an access operation in connection with the virtual logical storage device file system maintained by the virtual logical storage device in response to an access request that the remote access element receives from the operating system which includes the virtual logical storage device identifier, the remote access element during the access operation accessing the portion of said remote file system identified by the remote file system portion identifier; and B. an operating system request redirector for enabling the operating system to direct access requests which identify the virtual logical storage device to the remote access element.

83. A virtual file system accessing subsystem as defined in claim 82 in which the virtual logical storage device file system includes identifiers identifying a plurality of portions of a remote file system maintained by said another device, each access request further including a remote file system portion identifier identifying one of said remote file system portions, the remote access element in response to an access request initiating an access operation in connection with the remote file system portion identified in the access request.

84. A virtual file system accessing subsystem as defined in claim 82 in which the virtual logical storage device file system includes identifiers identifying at least respective portions of a plurality of remote file systems each maintained by one of a plurality of other devices connected in said network, each access request further including a remote file system portion identifier identifying one of said remote file system portions, the remote access element in response to an access request initiating an access operation in connection with the one of the other devices which maintains the remote file system portion identified in the access request.

85. A virtual file system accessing subsystem as defined in claim 82 in which the operating system comprises the MS-DOS and Windows operating systems.

86. A virtual file system accessing subsystem as defined in claim 82 in which the network is architected according to a client/server network architecture model, said another device comprising a server device, the computer system comprising a client device, the remote access element comprising a network file system client element.

87. A virtual file system accessing subsystem as defined in claim 82 in which the operating system request redirector comprises:

A. a virtual logical storage device information store for storing virtual logical storage device information including at least one virtual logical storage device identifier;

B. an operating system redirection enabler for retrieving the virtual logical storage device identifier from the virtual logical storage device information store and providing the virtual logical storage device identifier to the operating system thereby to enable the operating system to redirect access requests identifying the virtual logical storage device identifier to the remote access element.

88. A virtual file system accessing subsystem as defined in claim 87 in which the virtual logical storage device information store stores a plurality of virtual logical storage device identifiers, the operating system redirection enabler retrieving said plurality of virtual logical storage device identifiers from the virtual logical storage device information store and providing them to the operating system, thereby to enable the operating system to redirect access requests identifying any of the virtual logical storage device identifiers to the remote access element.

89. A virtual file system accessing subsystem as defined in claim 87 in which the virtual logical storage device information store further stores remote file system portion identifier information including at least one remote file system identifier, the remote access element using the remote file system identifier to identify said another device in initiating the access operation.

90. A virtual file system accessing subsystem as defined in claim 82 in which said remote file system portion has an associated mount status, the remote access element prior to initiating a said access operation determining if the mount status indicates that the remote file system portion is mounted to said virtual logical storage device file system and (i) if so, initiating the access operation, (ii) if not, enabling an automounter element to perform a mount operation if the mount status indicates that the remote file system portion is not mounted to said virtual logical storage device file system.

91. A virtual file system accessing subsystem as defined in claim 90 in which, if the automounter element indicates that a mount operation is successful, the remote access element initiates a said access operation in connection with the mounted remote file system portion.

92. A method of accessing virtual file system in a computer system connected in a computer network, the computer system running a selected operating system, the virtual file system accessing subsystem facilitating accessing of a virtual logical storage device that is identified by a virtual logical storage device identifier and that has a virtual logical storage device file system that includes an identifier identifying at least a portion of a remote file system maintained by another device connected in the computer network, the method comprising the steps of:

A. enabling the operating system to direct access requests which identify the virtual logical storage device to the remote access element; and B. enabling a remote access element to initiate an access operation in connection with the virtual logical storage device file system maintained by the virtual logical storage device in response to an access request that the remote access element receives from the operating system which includes the virtual logical storage device identifier, the remote access element during the access operation accessing the portion of said remote file system identified by the remote file system portion identifier.

93. A method as defined in claim 92 in which the virtual logical storage device file system includes identifiers identifying a plurality of portions of a remote file system maintained by said another device, each access request further including a remote file system portion identifier identifying one of said remote file system portions, the remote access element enabling step including the step of, in response to an access request, initiating an access operation in connection with the remote file system portion identified in the access request.

94. A method as defined in claim 92 in which the virtual logical storage device file system includes identifiers identifying at least respective portions of a plurality of remote file systems each maintained by one of a plurality of other devices connected in said network, each access request further including a remote file system portion identifier identifying one of said remote file system portions, the remote access element enabling step including the step of, in response to an access request, initiating an access operation in connection with the one of the other devices which maintains the remote file system portion identified in the access request.

95. A method as defined in claim 92 in which the operating system comprises the MS-DOS and Windows operating systems.

96. A method as defined in claim 92 in which the network is architected according to a client/server network architecture model, said another device comprising a server device, the computer system comprising a client device, the remote access element comprising a network file system client element.

97. A method as defined in claim 92 in which the operating system request redirecting step comprises the steps of:

A. providing a virtual logical storage device information store for storing virtual logical storage device information including at least one virtual logical storage device identifier;

B. retrieving the virtual logical storage device identifier from the virtual logical storage device information store and providing the virtual logical storage device identifier to the operating system thereby to enable the operating system to redirect access requests identifying the virtual logical storage device identifier to the remote access element.

98. A method as defined in claim 97 in which the virtual logical storage device information store stores a plurality of virtual logical storage device identifiers, the operating system redirection enabler retrieving said plurality of virtual logical storage device identifiers from the virtual logical storage device information store and providing them to the operating system, thereby to enable the operating system to redirect access requests identifying any of the virtual logical storage device identifiers to the remote access element.

99. A method as defined in claim 97 in which the virtual logical storage device information store further stores remote file system portion identifier information including at least one remote file system identifier, the remote access element enabling step including the step of using the remote file system identifier to identify said another device in initiating the access operation.

100. A method as defined in claim 92 in which said remote file system portion has an associated mount status, the remote access element prior to initiating a said access operation being enabled to determine if the mount status indicates that the remote file system portion is mounted to said virtual logical storage device file system and (i) if so, initiate the access operation, (ii) if not, enable an automounter element to perform a mount operation if the mount status indicates that the remote file system portion is not mounted to said virtual logical storage device file system.

101. A method as defined in claim 100 in which, if the automounter element indicates that a mount operation is successful, the remote access element enabling step includes the step of initiating a said access operation in connection with the mounted remote file system portion.

102. A virtual file system accessing subsystem computer program product for use in connection with a computer system connected in a computer network, the computer system running a selected operating system, the virtual file system accessing subsystem facilitating accessing of a virtual logical storage device that is identified by a virtual logical storage device identifier and that has a virtual logical storage device file system that includes an identifier identifying at least a portion of a remote file system maintained by another device connected in the computer network, the virtual file system accessing subsystem computer program product comprising a computer usable medium having computer system readable code embodied therein, the computer system readable code comprising:

A. remote access element code devices for enabling the computer to initiate an access operation in connection with the virtual logical storage device file system maintained by the virtual logical storage device in response to an access request that the remote access element receives from the operating system which includes the virtual logical storage device identifier, the remote access element code devices enabling the computer, during the access operation, to access the portion of said remote file system identified by the remote file system portion identifier; and B. operating system request redirector code devices for enabling the computer to enable the operating system to direct access requests which identify the virtual logical storage device for processing in response to the remote access element code devices.

103. A virtual file system accessing subsystem computer program product as defined in claim 102 in which the virtual logical storage device file system includes identifiers identifying a plurality of portions of a remote file system maintained by said another device, each access request further including a remote file system portion identifier identifying one of said remote file system portions, the remote access element code devices enabling the computer, in response to an access request, to initiate an access operation in connection with the remote file system portion identified in the access request.

104. A virtual file system accessing subsystem computer program product as defined in claim 102 in which the virtual logical storage device file system includes identifiers identifying at least respective portions of a plurality of remote file systems each maintained by one of a plurality of other devices connected in said network, each access request further including a remote file system portion identifier identifying one of said remote file system portions, the remote access element code devices enabling the computer, in response to an access request, to initiate an access operation in connection with the one of the other devices which maintains the remote file system portion identified in the access request.

105. A virtual file system accessing subsystem computer program product as defined in claim 102 in which the operating system comprises the MS-DOS and Windows operating systems.

106. A virtual file system accessing subsystem computer program product as defined in claim 102 in which the network is architected according to a client/server network architecture model, said another device comprising a server device, the computer system comprising a client device, the remote access element code devices comprising a network file system client element.

107. A virtual file system accessing subsystem as defined in claim 102 in which the operating system request redirector code devices comprise:

A. virtual logical storage device information store code devices for enabling the computer to store virtual logical storage device information including at least one virtual logical storage device identifier;

B. operating system redirection enabler code devices for enabling the computer to retrieve the virtual logical storage device identifier from the virtual logical storage device information store and provide the virtual logical storage device identifier for processing by the operating system thereby to enable the operating system to redirect access requests identifying the virtual logical storage device identifier for processing in response to the remote access element code devices.

108. A virtual file system accessing subsystem computer program product as defined in claim 107 in which the virtual logical storage device information store stores a plurality of virtual logical storage device identifiers, the operating system redirection enabler code devices enabling the computer to retrieve said plurality of virtual logical storage device identifiers from the virtual logical storage device information store and provide them for processing in response to the operating system, thereby to enable the operating system to redirect access requests identifying any of the virtual logical storage device identifiers to the remote access element.

109. A virtual file system accessing subsystem computer program product as defined in claim 107 in which the virtual logical storage device information store further stores remote file system portion identifier information including at least one remote file system identifier, the remote access element code devices enabling the computer to using the remote file system identifier to identify said another device in initiating the access operation.

110. A virtual file system accessing subsystem computer program product as defined in claim 102 in which said remote file system portion has an associated mount status, the remote access element code devices enable the computer, prior to initiating a said access operation, to determine if the mount status indicates that the remote file system portion is mounted to said virtual logical storage device file system and (i) if so, initiate the access operation, (ii) if not, initiate processing in response to automounter element code devices to perform a mount operation if the mount status indicates that the remote file system portion is not mounted to said virtual logical storage device file system.

111. A virtual file system accessing subsystem computer program product as defined in claim 110 in which, if the computer determines, while processing the automounter element code devices, that a mount operation is successful, the remote access element code devices enable the computer to initiate a said access operation in connection with the mounted remote file system portion.

* * * * *